(12) United States Patent
Mitani et al.

(10) Patent No.: US 12,008,934 B2
(45) Date of Patent: Jun. 11, 2024

(54) DISPLAY APPARATUS AND DISPLAY METHOD

(71) Applicant: SONY GROUP CORPORATION, Tokyo (JP)

(72) Inventors: Satoshi Mitani, Tokyo (JP); Tomoya Yano, Tokyo (JP); Yuji Nakahata, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/002,367

(22) PCT Filed: Jun. 7, 2021

(86) PCT No.: PCT/JP2021/021533
§ 371 (c)(1),
(2) Date: Dec. 19, 2022

(87) PCT Pub. No.: WO2021/261231
PCT Pub. Date: Dec. 30, 2021

(65) Prior Publication Data
US 2023/0237944 A1 Jul. 27, 2023

(30) Foreign Application Priority Data

Jun. 25, 2020 (JP) .................. 2020-109578

(51) Int. Cl.
*G09G 3/00* (2006.01)
*G06F 3/01* (2006.01)

(52) U.S. Cl.
CPC .............. *G09G 3/03* (2020.08); *G06F 3/011* (2013.01); *G09G 3/001* (2013.01);
(Continued)

(58) Field of Classification Search
CPC ...... H04N 13/363; G03B 21/10; G03B 21/62; G09G 3/03
See application file for complete search history.

(56) References Cited

U.S. PATENT DOCUMENTS 10,360,876 B1 * 7/2019 Rahman .................. G09G 5/14
2005/0094111 A1 5/2005 May et al.
(Continued)

FOREIGN PATENT DOCUMENTS

JP 2005-274692 A 10/2005
JP 2007-220651 A 8/2007
(Continued)

OTHER PUBLICATIONS

International Search Report and Written Opinion of PCT Application No. PCT/JP2021/021533, dated Aug. 17, 2021, 12 pages of ISRWO.

*Primary Examiner* — Koosha Sharifi-Tafreshi
(74) *Attorney, Agent, or Firm* — CHIP LAW GROUP

(57) ABSTRACT

A display apparatus according to an embodiment of the present technology includes a display unit, a motion sensor, a region setting unit, and an information generating unit. The display unit includes a tubular display whose directional range in which an image is displayed is larger than 180 degrees. The motion sensor detects an observer who observes the display. The region setting unit sets a first region visible from the observer and a second region different from the first region as regions on the display on the basis of a detection result of the motion sensor. The information generating unit generates main information displayed in the first region and illumination information regarding illumination light presented in accordance with the second region.

19 Claims, 16 Drawing Sheets

(52) U.S. Cl.
CPC ............... *G09G 2320/068* (2013.01); *G09G 2320/0686* (2013.01); *G09G 2340/0464* (2013.01); *G09G 2340/14* (2013.01); *G09G 2354/00* (2013.01)

(56) References Cited

U.S. PATENT DOCUMENTS

2019/0346982 A1\* 11/2019 Tokuchi ............... G06F 3/0233
2021/0356739 A1\* 11/2021 Yano ................... H04N 13/395

FOREIGN PATENT DOCUMENTS

| | | |
|---|---|---|
| JP | 2014-048565 A | 3/2014 |
| JP | 2019-197192 A | 11/2019 |
| WO | 2019/073688 A1 | 4/2019 |
| WO | 2019/202935 A1 | 10/2019 |
| WO | 2020/080111 A1 | 4/2020 |
| WO | 2020/110760 A1 | 6/2020 |

\* cited by examiner

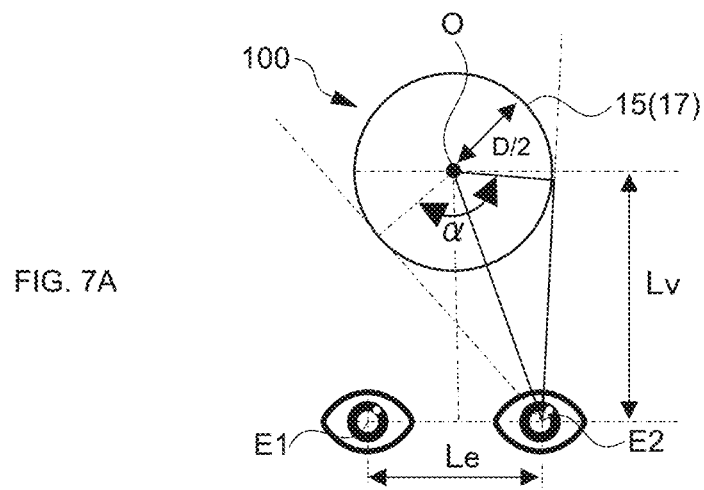
FIG. 7A
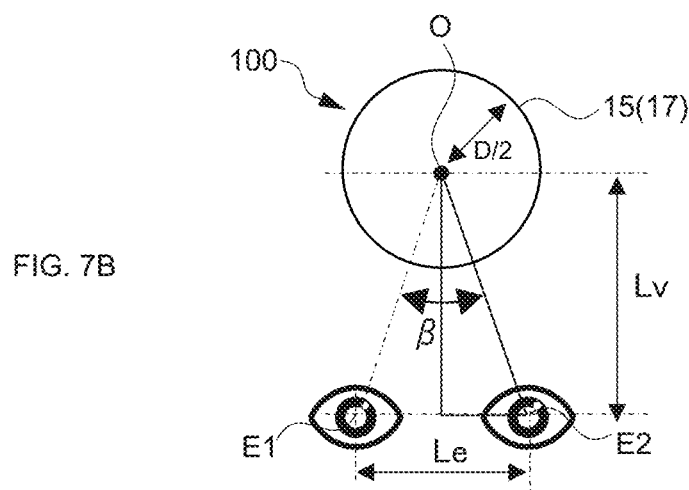
FIG. 7B
FIG. 8
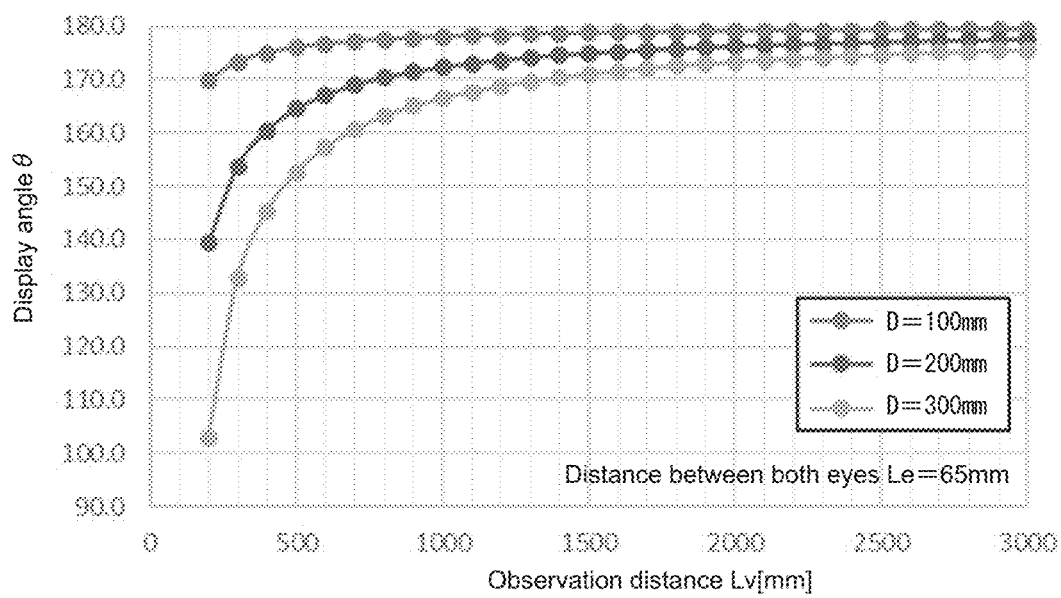

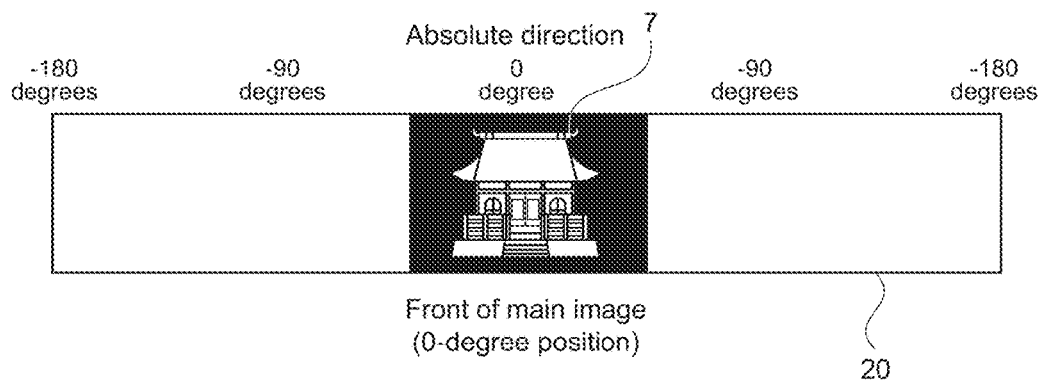
FIG. 11A
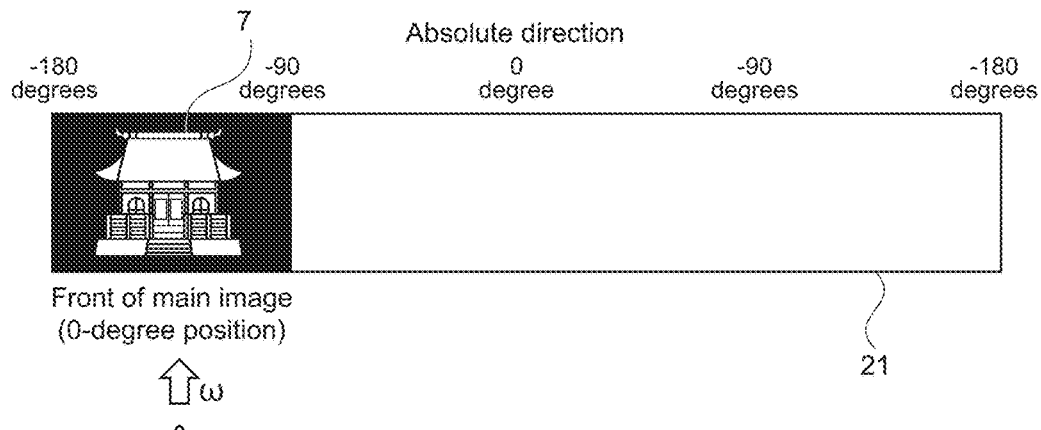
FIG. 11B
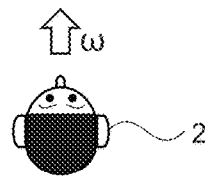

DISPLAY APPARATUS AND DISPLAY METHOD

CROSS REFERENCE TO RELATED APPLICATIONS

This application is a U.S. National Phase of International Patent Application No. PCT/JP2021/021533 filed on Jun. 7, 2021, which claims priority benefit of Japanese Patent Application No. JP 2020-109578 filed in the Japan Patent Office on Jun. 25, 2020. Each of the above-referenced applications is hereby incorporated herein by reference in its entirety.

TECHNICAL FIELD

The present technology relates to a display apparatus and a display method that display an image.

BACKGROUND ART

Conventionally, a method of effectively presenting an image displayed on a display has been known. Patent Literature 1 has described an illumination system for a video apparatus that combines a thin television with an illumination apparatus. In this system, a light source unit is provided for illuminating the back side and the viewing side of the display. Moreover, video data displayed on the display is analyzed and illumination data is generated. In accordance with this illumination data, the light source unit performs illumination. Accordingly, it is possible to emit light depending on luminance and colors of a screen displayed on the display, and it is possible to perform illumination with an expansion effect and a sense of presence (paragraphs [0083], [0104], and [0168] in the specification, FIG. 1, FIG. 2, etc. of Patent Literature 1).

CITATION LIST

Patent Literature

Patent Literature 1: Japanese Patent Application Laid-open No. 2007-220651

DISCLOSURE OF INVENTION

Technical Problem

In recent years, a tubular display and the like capable of displaying an image in multiple directions have been developed, and it is desirable to provide a technology that realizes effective presentation depending on an observation direction.

In view of the above-mentioned circumstances, it is an object of the present technology to provide a display apparatus and a display method that can realize effective presentation depending on an observation direction.

Solution to Problem

In order to accomplish the above-mentioned object, a display apparatus according to an embodiment of the present technology includes a display unit, a motion sensor, a region setting unit, and an information generating unit.

The display unit includes a tubular display whose directional range in which an image is displayed is larger than 180 degrees.

The motion sensor detects an observer who observes the display.

The region setting unit sets a first region visible from the observer and a second region different from the first region as regions on the display on the basis of a detection result of the motion sensor.

The information generating unit generates main information displayed in the first region and illumination information regarding illumination light presented in accordance with the second region.

In this display apparatus, an image is displayed in the directional range larger than 180 degrees on the tubular display. The observer who observes this display is detected, and the first region visible from the observer and the second region different from the first region are set on the basis of the detection result. Then, the main information displayed in the first region and the illumination information of the illumination light according to the second region are generated. Accordingly, it is possible to perform illumination or the like according to the position of the observer, for example, and it is possible to realize effective presentation depending on the observation direction.

A display method according to an embodiment of the present technology includes detecting an observer who observes a tubular display whose directional range in which an image is displayed is larger than 180 degrees.

A first region visible from the observer and a second region different from the first region as regions on the display are set on the basis of a detection result of the motion sensor.

Main information displayed in the first region and illumination information regarding illumination light presented in accordance with the second region are generated.

BRIEF DESCRIPTION OF DRAWINGS

FIGS. 7A and 7B A schematic view showing an example of a method of calculating a display angle θ.

FIG. 8 A graph showing a setting example of the display angle θ.

FIGS. 11A and 11B A schematic view showing a method of setting a position of a main image in output image data.

MODE(S) FOR CARRYING OUT THE INVENTION

Hereinafter, embodiments according to the present technology will be described with reference to the drawings.

First Embodiment

Figure 1:
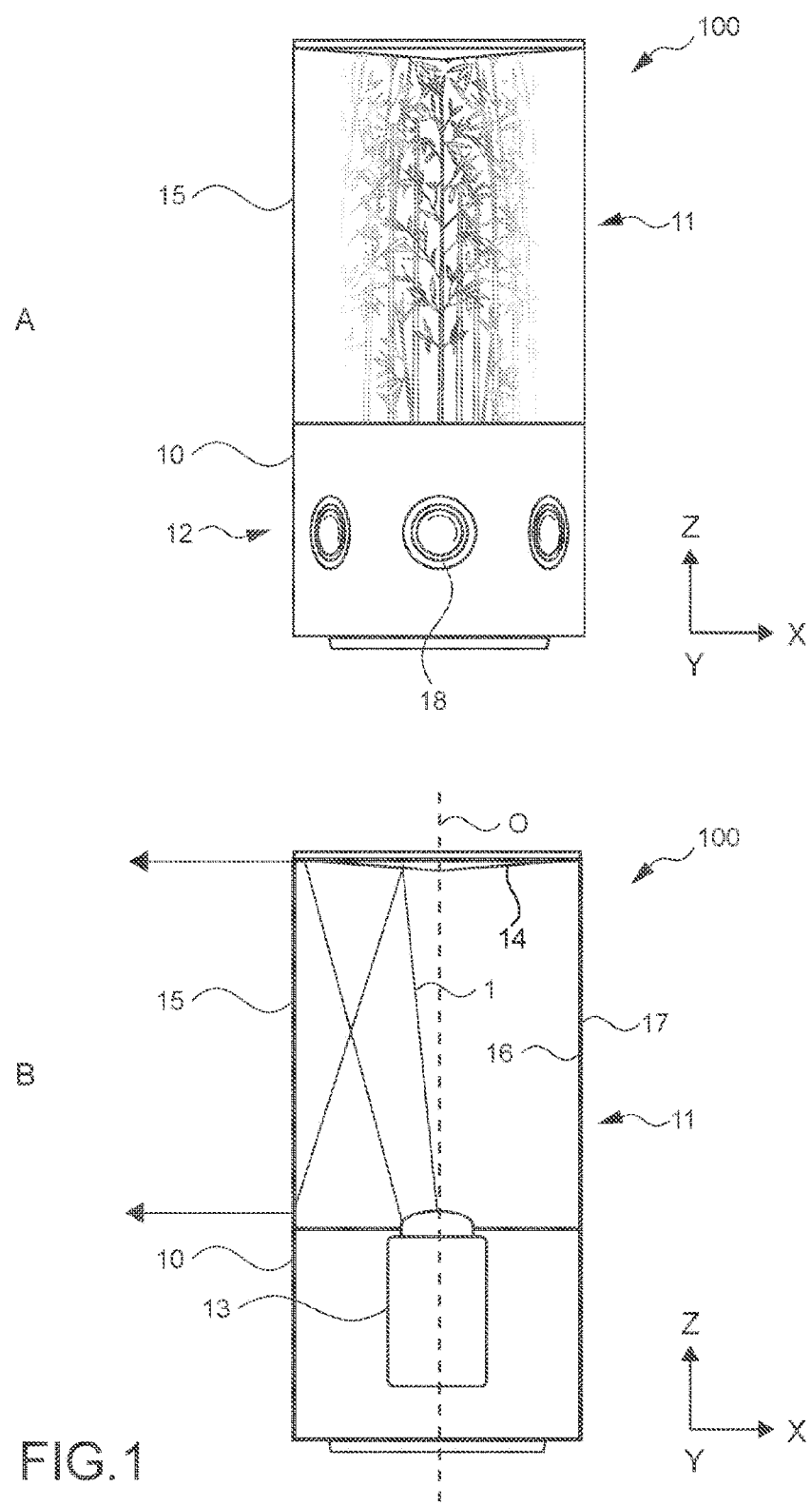
FIGS. 1A and 1B A schematic view showing a configuration example of a display apparatus according to a first embodiment of the present technology.

[Configuration of Display Apparatus] FIGS. 1A and 1B is a are schematic views showing a configuration example of a display apparatus according to a first embodiment of the present technology.

A display apparatus 100 is a tubular apparatus capable of displaying an image in multiple directions. In the present disclosure, the image includes a still image and a moving image (video).

In the present embodiment, the display apparatus 100 is generally configured as a cylindrical apparatus. Hereinafter, a direction parallel to a center axis O of the cylindrical display apparatus 100 (direction in which the display apparatus 100 extends) will be referred to as a Z-axis direction. Moreover, directions orthogonal to each other in a plane crossing the Z-axis direction at a right angle will be referred to as an X-axis direction and a Y-axis direction.

FIG. 1A is a side view showing an outer appearance of the display apparatus 100 as viewed in the Y-axis direction. FIG. 1B is a cross-sectional view showing a cross-section of the display apparatus 100, which is taken along an XZ-plane including the center O.

As shown in FIGS. 1A and 1B, the display apparatus 100 includes a base unit 10, a display unit 11, and a motion sensor 12.

The base unit 10 is a casing that is a base for the display apparatus 100. The display apparatus 100 is used with the base unit 10 placed on a desk, floor, or the like. Hereinafter, the side on which the base unit 10 is provided will be referred to as a lower side of the display apparatus 100 and the opposite side (side on which a reflection mirror 14 to be described later is provided) will be referred to as an upper side of the display apparatus 100.

The base unit 10 has a side surface having an approximately cylindrical shape and a bottom surface connected to a lower side of the side surface. The base unit 10 has a cavity therein. In an inner space of the base unit 10, there are provided an image projecting unit 13, a storage unit 19, a controller 30, and the like of the display unit 11 to be described later. Moreover, the motion sensor 12 is provided in the side surface of the base unit 10. In addition, a communication module, a power supply module, and the like (not shown) may be provided in the base unit 10.

The display unit 11 is a display module capable of multi-directional display that displays an image in multiple directions. In the present embodiment, a projection-type display module is used as the display unit 11.

The display unit 11 includes the image projecting unit 13, the reflection mirror 14, and a screen 15. The screen 15 of them functions as a display according to the present embodiment.

The image projecting unit 13 is a projector that projects image light 1. Here, the image light 1 is light that configures an image and includes light beams for displaying respective pixels included in the image. The image light 1 is radially projected, centered at a predetermined optical axis. As shown in FIG. 1B, the image projecting unit 13 is arranged in an inner space of the base unit 10, oriented toward the upper side of the display apparatus 100 so that the optical axis coincides with the center axis O.

Although the image projecting unit 13 is typically a color projector capable of displaying a color image, a projector or the like that performs monotone display may be used.

A specific configuration of the image projecting unit 13 is not limited. For example, a laser projector or the like including a laser light source is used. Alternatively, a projector including a light source, such as a light emitting diode (LED) light source and a halogen lamp may be used.

The reflection mirror 14 reflects the image light 1 projected from the image projecting unit 13 toward the screen 15. The reflection mirror 14 has a reflection surface that reflects the image light 1. The reflection surface is arranged on the upper side of the display apparatus 100, oriented toward the image projecting unit 13.

The reflection mirror 14 is typically designed so that the image light 1 reflected on the reflection surface can enter any position on the screen 15 at an equal incident angle. Such a design can be realized by configuring the reflection surface as appropriate using, for example, a paraboloid or a freeform surface.

In the example shown in FIG. 1B, the image light 1 radially projected centered at the center axis O is reflected in a direction to be spaced away from the center axis O as approximately parallel light (parallel light) on a plane including the center axis O. Accordingly, the image light 1 can enter the screen 15 at the same incident angle. Moreover, controlling the angle of the parallel light can control the incident angle on the screen 15.

In addition, a specific configuration of the reflection mirror 14 is not limited.

The screen 15 diffuses the entering image light 1 to display an image.

In the present embodiment, a cylindrical screen having the center axis O as the center is used as the screen 15. The screen 15 is used, bonded on the inside or outside of a cylindrical transparent member (not shown), for example. Alternatively, the screen 15 itself may be configured as a structure member. The base unit 10 is connected to a lower side of the screen 15 and the reflection mirror 14 is connected to an upper side of the screen 15.

Hereinafter, an inner surface of the screen 15, i.e., a surface facing the center axis O will be referred to as an inner circumferential surface 16. Moreover, an outer surface of the screen 15, i.e., a surface in opposite to the inner circumferential surface 16 will be referred to as an outer circumferential surface 17.

As shown in FIGS. 1A and 1B, the screen 15 is a transmissive-type diffusion screen that emits the image light 1, which has entered from the inner circumferential surface 16, from the outer circumferential surface 17 as diffused light. Therefore, diffused light of the respective pixels that configure the image is emitted from the outer circumferential surface 17. Accordingly, the outer circumferential surface 17 is a cylindrical display surface on which the image is displayed. Thus, the screen 15 configures a cylindrical surface (outer circumferential surface 17) on which the image is displayed.

Moreover, in the present embodiment, the screen 15 is configured to be capable of displaying an image in directions of 360 degrees, using the center axis O as the axis. That is, the screen 15 is a 360-degree screen (360-degree display) capable of displaying an image in the entire periphery. Accordingly, an observer can observe an image displayed on the screen 15 in any direction.

It should be noted that the screen 15 does not necessarily need to be capable of displaying an image in all directions, and for example, such a structure (slit or the like) that an image is not displayed in some directions on the outer circumferential surface 17. Specifically, a tubular screen 15 whose directional range in which an image is displayed is larger than 180 degrees can be used. Such a screen 15 always has a region in which an image is invisible from the observer. The present technology is applied to the tubular screen 15 having such a region in which an image is invisible.

Hereinafter, the 360-degree screen will be mainly described.

Typically, a transparent diffusion screen configured with transmissive-type holographic optical element (HOE) is used as the screen 15. Here, the HOE is a device that diffracts incident light by using interference fringes. By exposing these interference fringes to light as appropriate exposure, it is possible to change a light travelling direction or diffused light.

In the present embodiment, the screen 15 that diffuses light, which has entered the inner circumferential surface 16 at a predetermined incident angle, in an approximately perpendicular direction from the outer circumferential surface 17 is configured using the transmissive-type HOE. The above-mentioned reflection mirror 14 is configured to cause the image light 1 to enter the screen 15 at this predetermined incident angle. Accordingly, the brightest image is displayed on the outer circumferential surface 17 of the screen 15 as viewed in a perpendicular direction.

It should be noted that light, which has entered the screen 15 (transmissive-type HOE) at angles other than the predetermined incident angle, hardly undergoes diffraction due to the interference fringes and transmit through the screen 15. For this reason, for example, light for a background and the like that enters the screen 15 at a right angle transmits through the screen 15 as it is. The observer can observe an image or the like superimposed on the background that is located on an opposite side having the screen 15 therebetween. Therefore, it can be said that the screen 15 is a transparent screen (transparent display) that transmits visible light.

In this manner, the display unit 11 is configured to project a video from the image projecting unit 13 (projector) arranged at the center of the bottom of the display apparatus 100 in all directions of 360 degrees on the screen 15 (transparent diffusion screen) wrapped with the reflection mirror 14 as the upper surface in a cylindrical form.

It should be noted that not only a configuration using the projector and the transparent diffusion screen, but also another configuration may be used as a configuration of the display unit 11.

For example, a curved display or the like configured with a transparent organic light emitting diode (OLED) or transparent light emitting diode (LED) may be used as the display unit 11. Alternatively, a transparent microphone LED display or the like having a LED device reduced in size may be used. In addition, a configuration of the display unit 11 is not limited, and any transparent display of projection-type or spontaneous light-emitting type may be used.

The motion sensor 12 detects an observer who observes the screen 15. Specifically, a sensor capable of detecting a direction in which an observer 2 is present and a distance to the observer 2 is used as the motion sensor 12.

In the present embodiment, a plurality of camera sensors 18 that images the periphery of the display apparatus 100 is used as the motion sensor 12. In the example shown in FIGS. 1A and 1B, the plurality of camera sensors 18 is provided on the side surface of the base unit 10 on the lower side of the screen 15 along the outer circumference.

The camera sensors 18 are arranged to be capable of imaging the entire periphery of the display apparatus 100 (directions of 360 degrees), respectively. For example, in a case where an angle-of-view of one camera sensor 18 in the direction of a direction angle is 60 degrees, six camera sensors 18 are arranged at equal intervals on the side surface of the base unit 10.

The camera sensors 18 are, for example, RGB cameras that images color images, and digital cameras including image sensors such as complementary metal-oxide semiconductor (CMOS) sensors and charge coupled device (CCD) sensors are used.

Alternatively, infrared cameras or the like that take infrared images by receiving infrared light may be used as the camera sensors 18. In this case, an infrared light source is arranged on a side surface of the display apparatus 100 or the like. Accordingly, the observer can be accurately detected.

The motion sensor 12 is not limited to the camera sensors 18 and may be configured with other sensors. For example, a pyroelectric sensor that searches for the observer as a heat source, an ultrasonic sensor that detects ultrasonic waves reflected on the observer, a time of flight (ToF) sensor that measures a distance to the observer by a ToF method, a directional microphone that detects voice and movement sound of the observer 2, and the like may be used. Moreover, one of these sensors may be used alone or plural kinds of sensors may be used in combination. Hereinafter, the illustration of the motion sensor 12 will be omitted in some cases.

[Operation Overview of Display Apparatus]

Figure 2A:
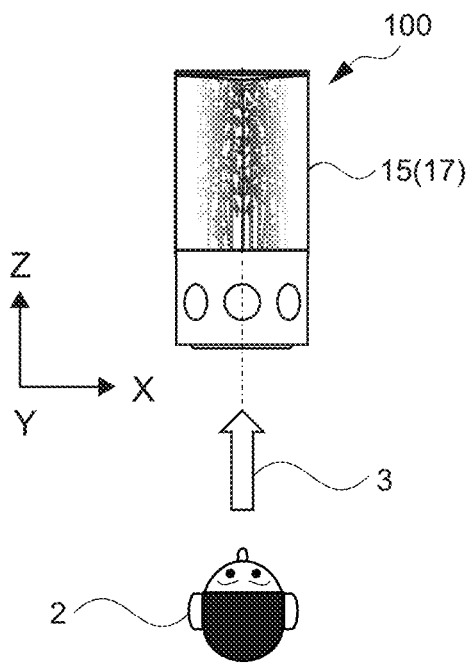
FIGS. 2A, 2B, and 2C A schematic view showing an example of image display by the display apparatus.
Figure 2B:
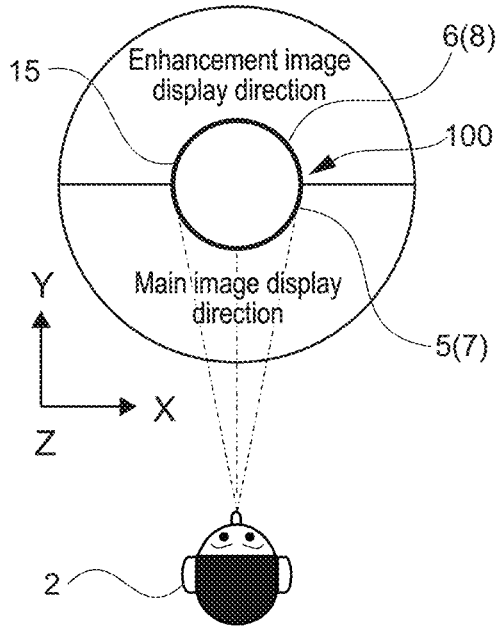
Figure 2C:
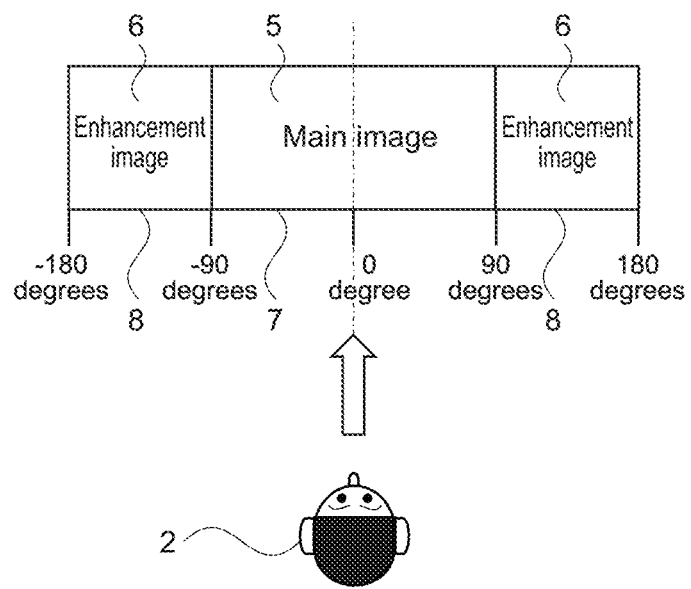

FIGS. 2A, 2B, and 2C is a are schematic views showing an example of image display by the display apparatus 100. Here, an operation overview of the display apparatus 100 will be described.

FIGS. 2A and 2B are schematic views as a state in which the observer 2 observes the screen 15 is viewed from the side surface and the upper surface of the display apparatus 100. FIG. 2C is a net in which the outer circumferential surface 17 of the screen 15 is laid out in a plane.

As shown in FIG. 2A, it is assumed that one observer 2 is observing the screen 15 in a direction. As described above, since the screen 15 is the 360-degree screen, a directional range in which an image displayed on the screen 15 can be observed covers all directions around the display apparatus 100.

At this time, in the display apparatus 100, a direction in which the observer 2 observes the screen 15 is estimated on the basis of output of the motion sensor 12. Then, a plurality of display regions is set on the screen 15 in accordance with the direction (observation direction 3) in which the observer 2 observes the screen 15.

FIG. 2C schematically illustrates an example of a display region set on the screen 15. In the present embodiment, a main display region 5 and a sub-display region 6 are set on the screen 15. It should be noted that the main display region 5 and the sub-display region 6 shown in FIG. 2C are merely an example.

Hereinafter, a direction based on the observation direction 3 is defined as a relative direction. For example, a direction to the observer 2 from the center axis O of the screen 15 is defined as a point of origin (relative direction=0 degrees) of the relative direction. In FIG. 2C, setting examples of the main display region 5 and the sub-display region 6 are illustrated using the relative direction.

Moreover, a direction based on the display apparatus 100 is defined as an absolute direction. For example, a direction set at a front position of the display apparatus 100 is defined as a point of origin (absolute direction=0 degrees) of the absolute direction. Although as for the above-mentioned relative direction, the point of origin changes in accordance with the observation direction 3, the absolute direction is a direction fixed with respect to the display apparatus 100.

The main display region 5 is a display region set at a portion on the screen 15, which is visible from the observer 2. Therefore, the observer 2 can view the main display region 5 directly.

In FIG. 2C, as an example of the main display region 5, a rectangular region whose relative direction is ±90 degrees is set. Moreover, a width of the main display region 5 in the upper and lower directions is set to be the same width as the screen 15. That is, a front semi-surface of the screen 15 as viewed from the observer 2 is the main display region 5.

In the present embodiment, the main display region 5 corresponds to a first region.

Moreover, a main image 7 is displayed in the main display region 5. Here, the main image 7 is, for example, an image that should be displayed to the observer 2 and is an image that is main content for the display apparatus 100.

For example, an image of a landscape, character, or the like is displayed in the main display region 5 as the main image 7. Moreover, the main image 7 may be an image that varies depending on a viewing direction or may be an image that displays constantly the same scene irrespective of the viewing direction. Moreover, for example, a UI screen, a message screen, or the like may be displayed as the main image 7.

In the present embodiment, information about the main image 7 is an example of the main information displayed in the first region.

The sub-display region 6 is a display region set in a portion different from the main display region 5. The sub-display region 6 also includes a portion that the observer 2 cannot view directly, for example.

In FIG. 2C, as an example of the sub-display region 6, a rectangular region whose relative direction ranges from −90 degrees to −180 degrees and a rectangular region whose relative direction ranges from +90 degrees to +180 degrees are set. Moreover, a width of the sub-display region 6 in the upper and lower directions is set to be the same width as the screen 15. Therefore, the entire region of the screen 15 other than the main display region 5 (that is, a rear semi-surface of the screen 15 as viewed from the observer 2) is set as the sub-display region 6.

In the present embodiment, the sub-display region 6 corresponds to a second region.

Moreover, an enhancement image 8 is displayed in the sub-display region 6. Here, the enhancement image 8 is, for example, an image that generates illumination light to enhance (enlarge) the main image 7. That is, it can be said that the enhancement image 8 is an image that generates illumination light by being displayed in the sub-display region 6 for adding an effect to the display of the main image 7. Therefore, light of the enhancement image 8 diffused on the screen 15 functions as illumination light presented in accordance with the sub-display region 6.

In the present embodiment, information about the enhancement image 8 is an example of illumination information regarding the illumination light presented in accordance with the second region.

In the present embodiment, the main image 7 and the enhancement image 8 are simultaneously displayed to the main display region 5 and the sub-display region 6 set in the above-mentioned manner. FIG. 2B schematically illustrates a direction (directional range) in which each image is displayed in a case where the main image 7 and the enhancement image 8 are displayed in the main display region 5 and the sub-display region 6 shown in FIG. 2C, respectively.

Here, the main image 7 is displayed on a front half of the screen 15 and the enhancement image 8 is displayed on a rear half of the screen 15 to the observer 2. By displaying the enhancement image 8 in this manner, the periphery (e.g., wall, floor, ceiling, or other furniture) of the display apparatus 100 is illuminated, and an illumination effect to enhance (enlarge) the main image 7 can be realized.

Figure 3:
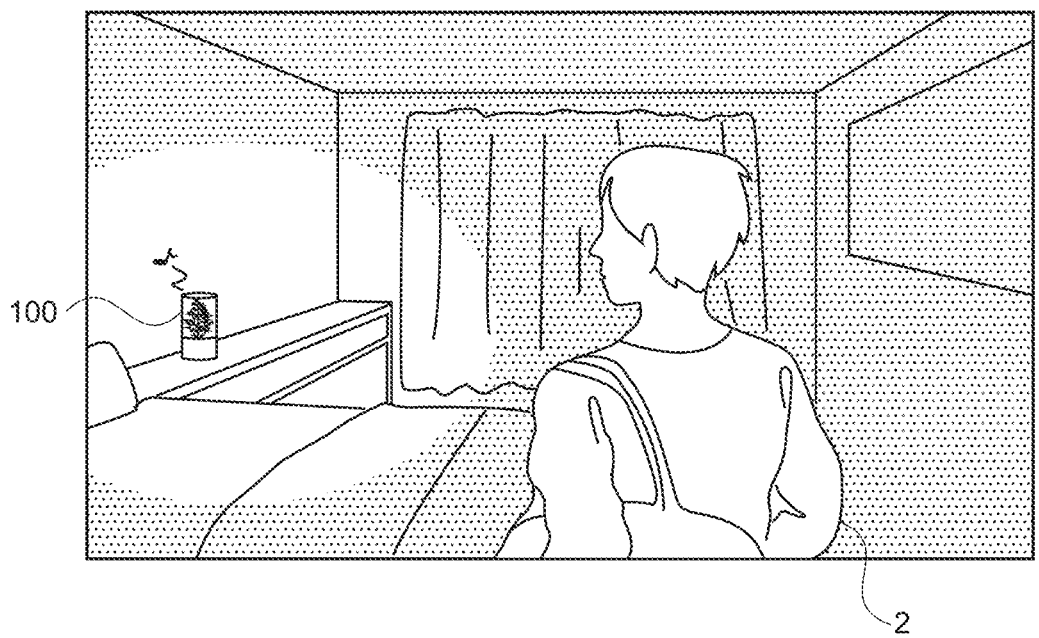
FIG. 3 A schematic view showing a usage example of the display apparatus.

FIG. 3 is a schematic view showing a usage example of the display apparatus 100. FIG. 3 schematically illustrates an image when an illumination effect to enhance the main image 7 is applied. In this image, the periphery of the display apparatus 100 is irradiated with illumination light that effectively presents the main image 7 in a generally dark room. As shown in FIGS. 2A, 2B, and 2C, the display apparatus 100 is used, placed in a room such as a living room and a bedroom, for example.

For example, in a case where a video of a bamboo forest is displayed as the main image 7, the atmosphere of the room can match the video (main image 7) by displaying the enhancement image 8 to illuminate the periphery in green. In this case, the video of the bamboo forest is displayed as the main image 7 in the main display region 5 on the screen 15, which is visible from the observer 2. Moreover, in the sub-display region 6 other than the main display region 5 (e.g., the region invisible from the observer 2), a green video is displayed as the enhancement image 8. Accordingly, for example, a spatial extension of the bamboo forest can be presented.

Moreover, the main display region 5 and the sub-display region 6 are dynamically set on the basis of output of the motion sensor 12. Accordingly, it is possible to the display video (main image 7) wished to be presented to an area in which the observer 2 is located and to the display video (enhancement image 8) to enhance the video wished to be presented to an area in which the observer 2 is not located. As a result, it is possible to effectively present the atmosphere of the main image 7 and the like without lowering the visibility of the main image 7, and it is possible to effectively present the space where the image is viewed.

[Functional Blocks of Display Apparatus]

Figure 4:
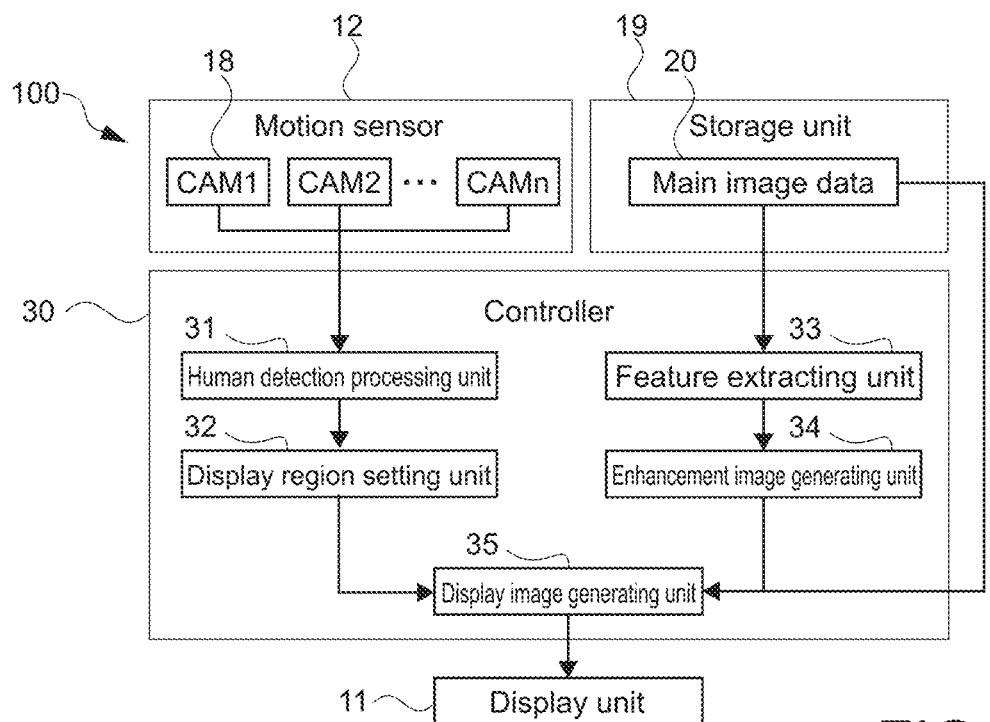
FIG. 4 A block diagram showing a functional configuration example of the display apparatus.

FIG. 4 is a block diagram showing a functional configuration example of a display apparatus. The display apparatus 100 further includes the storage unit 19 and the controller 30 in addition to the display unit 11 and the motion sensor 12 described above.

The storage unit 19 is a nonvolatile storage device. For example, a recording medium using a solid-state device such as a solid-state drive (SSD) or a magnetic recording medium such as a hard disk drive (HDD) is used as the storage unit 19. In addition, the type and the like of the recording medium used as the storage unit 19 are not limited, and for example, any recording medium that records non-transitory data may be used.

A control program (not shown) for controlling general operations of the display apparatus 100 is stored in the storage unit 19. The control program is a program according to the present embodiment and the storage unit 19 functions as a computer-readable recording medium in which the program is recorded.

Moreover, main image data 20 that is data about the main image 7 is stored in the storage unit 19. For example, image data of all directions of 360 degrees is used as the main image data 20. A format and the like of the main image data 20 are not limited.

The main image data 20 may be read from a server on a network or the like via a communication unit (not shown) for example or may be read in the storage unit 19 from another device (e.g., smartphone or digital camera).

The controller 30 controls the operation of each block of the display apparatus 100. The controller 30, for example, has a hardware configuration required for a computer, such as a CPU and a memory (RAM, ROM). The CPU loads the control program stored in the storage unit 19 into the RAM and executes the control program, and various types of processing are thus performed. The controller 30 functions as an information processing apparatus according to the present embodiment.

For example, a programmable logic device (PLD) such as a field programmable gate array (FPGA) or another device such as an application specific integrated circuit (ASIC) may be used as the controller 30. Moreover, for example, a processor such as a graphics processing unit (GPU) may be used as the controller 30.

In the present embodiment, the CPU of the controller 30 executes the program according to the present embodiment, and a human detection processing unit 31, a display region setting unit 32, a feature extracting unit 33, an enhancement image generating unit 34, and a display image generating unit 35 are thus realized as functional blocks. Then, these functional blocks perform a display method according to the present embodiment. It should be noted that dedicated hardware such as an integrated circuit (IC) may be used as appropriate in order to realize the respective functional blocks.

The human detection processing unit 31 detects the position of the observer 2 who observes the screen 15 in the periphery of the display apparatus 100 on the basis of output of the motion sensor 12 and generates positional information of the observer 2. Here, the positional information of the observer 2 is information capable of expressing the position of the observer 2 as it is viewed from the display apparatus 100 (screen 15). In the present embodiment, the position at which the observer 2 is located is detected on the basis of videos from the plurality of camera sensors 18 and the positional information is generated on the basis of the detection results.

Specifically, a direction (absolute direction) of the observer 2 as it is viewed from the display apparatus 100 is detected as the positional information. For example, a front position is set to the display apparatus 100 and image processing and the like are performed using the front position as the basis. A direction of the observer 2 is calculated in a range of ±180 degrees using this front position as the basis (or in a range of 0 degrees to 360 degrees).

Moreover, a distance to the observer 2 as it is viewed from the display apparatus 100 may be detected as the positional information. In this case, for example, the distance to the observer 2 (distance to a viewpoint) is calculated on the basis of the center axis O of the display apparatus 100 (screen 15). In addition, a coordinate position in a plane (XY-plane) orthogonal to the center axis O may be calculated as the positional information of the observer 2.

Based on the detection result of the motion sensor 12, the display region setting unit 32 sets the main display region 5 visible from the observer 2 and the sub-display region 6 different from the main display region 5 as the regions on the screen 15. In the present embodiment, the main display region 5 and the sub-display region 6 are respectively set in a range of the screen 15 for 360 degrees on the basis of the positional information of the observer 2 output from the human detection processing unit 31. A method of setting each display region will be described later in detail.

In the present embodiment, the display region setting unit 32 corresponds to a region setting unit.

The feature extracting unit 33 extracts feature amounts of the main image 7 on the basis of the main image data 20. For example, on the basis of each pixel value of the main image 7, parameters representing main colors of the main image 7 and luminance values of the main image 7 are calculated as the feature amounts. Moreover, for example, in a case where the main image 7 is a video, motion patterns in the main image 7 (e.g., the direction and speed of a motion of an element in the image, which dynamically varies in position) are calculated as the feature amounts on the basis of data for a plurality of frames. Alternatively, the amount of change in color and luminance and the like may be calculated.

A method of calculating each feature amount is not limited, and any image recognition technology capable of extracting features of the main image 7 may be used.

Based on the feature amounts of the main image 7 extracted by the feature extracting unit 33, the enhancement image generating unit 34 generates an enhancement image 8 depending on the main image 7.

The enhancement image generating unit 34 generates the enhancement image 8 to generate illumination light in a color similar to that of the main image 7, for example. For example, in a case where the main image 7 is a generally green image, a green enhancement image 8 is generated. In addition, an enhancement image 8 that changes in accordance with the luminance and motion of the main image 7 may be generated.

Moreover, for example, image data of all directions of 360 degrees is generated as the enhancement image 8. In this case, data of a required range is extracted by the display image generating unit 35 to be described later and used.

A method of generating the enhancement image 8 is not limited.

The display image generating unit 35 generates output image data (display video) output to the display unit 11. The output image data is finally data about the image displayed on the screen 15.

Specifically, the display image generating unit 35 generates output image data combining the main image 7 with the enhancement image 8, which correspond to the display regions, respectively, on the basis of information about the main display region 5 and the sub-display region 6 set by the display region setting unit 32.

As described above, in the present embodiment, the main image 7 and the enhancement image 8 are prepared for all directions of 360 degrees. For example, in a case where a 0-degree position (front position) of each image is determined, each 0-degree position is adjusted to the position of the observer 2 (relative direction=0 degrees) and then the main image 7 and the enhancement image 8 are cut out for each main display region 5 and each sub-display region 6 for generating output image data. The output image data is generated by combining the cut-out images.

Moreover, in the present embodiment, data expressing a rectangular image that the image projecting unit 13 projects toward the reflection mirror 14 is generated as the output image data. The reflection mirror 14 reflects the rectangular image, such that the main image 7 and the enhancement image 8 are displayed in the entire periphery of the screen 15. Therefore, the output image data includes the main image 7 and the enhancement image 8 modified in accordance with an optical system of the display unit 11.

The display image generating unit 35 generates the output image data so that the main image 7 and the enhancement image 8 are properly displayed in the main display region 5 and the sub-display region 6 on the screen 15, respectively, considering such a projection optical system of the display unit 11.

Thus, the output image data is data including the information about the main image 7 (main information) and the information about the enhancement image 8 (illumination information).

In the present embodiment, the above-mentioned feature extracting unit 33, the enhancement image generating unit 34, and the display image generating unit 35 cooperate to realize the information generating unit that generates the main information displayed in the first region and the illumination information regarding the illumination light presented in accordance with the second region.

[Basic Operation of Display Apparatus]

Figure 5:
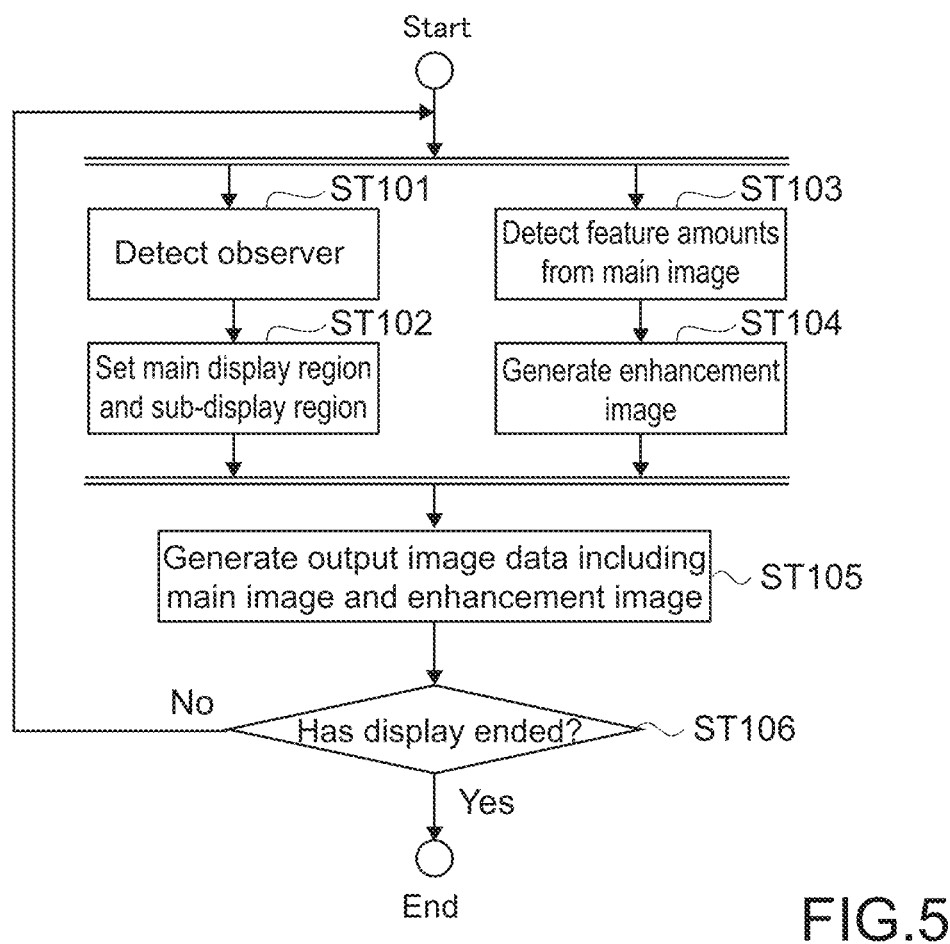
FIG. 5 A flowchart showing a basic operation of the display apparatus.

FIG. 5 is a flowchart showing a basic operation of the display apparatus. The processing shown in FIG. 5 is, for example, loop processing repeatedly performed during the operation of the display apparatus 100.

Here, processing of setting display regions in accordance with the direction of the observer 2 (Steps 101 and 102) and processing of generating an enhancement image proper for features of the main image (Steps 103 and 104) are performed in parallel.

In Step 101, an observer 2 located in the periphery of the display apparatus 100 is detected. Here, the human detection processing unit 31 reads a detection result of the motion sensor 12 (e.g., an image of the periphery of the display apparatus 100) and generates positional information of the observer 2. For example, an absolute direction of the observer 2 as it is viewed from the display apparatus 100 is estimated as the positional information. The positional information is output to the display region setting unit 32.

In Step 102, the main display region 5 and the sub-display region 6 are set. Here, on the basis of the positional information of the observer 2, the display region setting unit 32 sets each of a main display region 5 and a sub-display region 6. Typically, a main display region 5 is set and then a sub-display region 6 is set in accordance with the main display region 5.

For example, in a case where the distance to the observer 2 and the like are detected as the positional information of the observer 2, the main display region 5 is set using a method shown in FIGS. 6A and 6B to be described later or the like. Alternatively, a predetermined directional range (e.g., ±90 degrees as shown in FIGS. 2A, 2B, and 2C) centered at the absolute direction of the observer 2 is set to the main display region 5. Moreover, once the main display region 5 is set, the sub-display region 6 is set as appropriate in accordance with a result thereof. Information about each display region is output to the display image generating unit 35.

In Step 103, feature amounts are detected from the main image 7. Here, the feature extracting unit 33 reads the main image 7 to be reproduced and extracts feature amounts of the main image 7.

In a case where the main image 7 is a video or the like, features of the video, such as colors, luminance, and motion, constantly change. The feature extracting unit 33 extracts such feature amounts that change over time as appropriate by performing image recognition processing or the like. Information about the feature amounts is output to the enhancement image generating unit 34.

In Step 104, an enhancement image 8 is generated. Here, the enhancement image generating unit 34 generates an enhancement image 8 on the basis of the feature amounts of the main image 7.

For example, an image in colors similar to the colors of the main image 7 is generated. Moreover, an enhancement image 8 that changes in luminance, pattern, and the like of the image is generated in accordance with changes in luminance and motion of the main image 7, for example.

It should be noted that the enhancement image 8 is generated as image data for all directions and is output to the display image generating unit 35.

Next, output image data including the main image 7 and the enhancement image 8 is generated (Step 105). Here, the display image generating unit 35 generates image data including the main image 7 and the enhancement image 8. At this time, positions at which the main image 7 and the enhancement image 8 are to be displayed are determined on the basis of information about the main display region 5 and the sub-display region 6 set by the display region setting unit 32.

The generated output image data is output to the display unit 11 (image projecting unit 13). As a result, the main image 7 that is the main content is displayed in the main display region 5 on the screen 15, which is visible from the observer 2, and the enhancement image 8 that generates illumination light is displayed in the other sub-display region 6.

When the output image data is generated, whether or not the display processing by the display apparatus 100 has ended is determined (Step 106).

For example, in a case where the display has ended by switching off the display apparatus 100 (Yes in Step 106), the display processing ends. Moreover, in a case where the display has not ended (No in Step 106), the above-mentioned parallel processing is performed again. Therefore, for example, in a case where the observer 2 has moved, the main image 7 and the enhancement image 8 are displayed in accordance with the moved position of the observer 2.

It should be noted that a cycle for detecting the observer 2 in Step 101 and a cycle for performing image display processing (processing of generating the output image data) do not always coincide with each other. For example, in Step 101, the positional information of the observer 2 is updated in an operational cycle of the human detection processing unit 31. On the other hand, the series of processing of generating the output image data is performed at a frame rate set in advance, for example.

For this reason, for example, in a case where the operation of the human detection processing unit 31 is not in time for updating the output image data, the display region setting unit 32 outputs, as the processing of Step 102, information about the main display region 5 and the sub-display region 6 calculated in the past (typically, latest information). That is, in a case where detection of the observer 2 is not in time, old display regions are used as they are. Accordingly, it is possible to continuously display the video without freezing, for example.

Figure 6A:
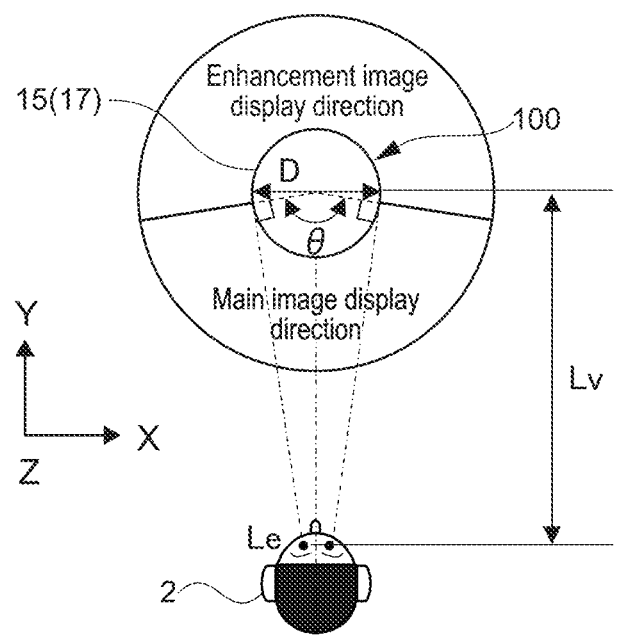
FIGS. 6A and 6B A schematic view for describing a main display region set for one observer.
Figure 6B:
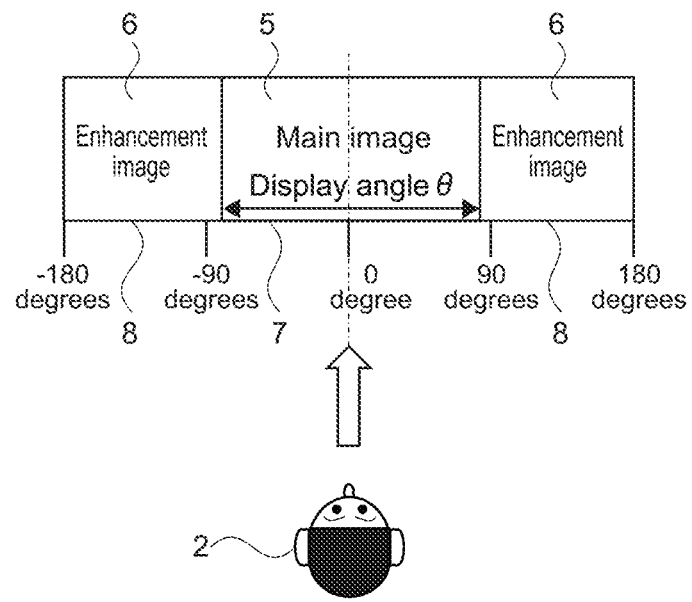

[Settings of Main Display Region and Sub-Display Region] FIGS. 6A and 6B is a are schematic views for describing a main display region 5 set for one observer 2. FIG. 6A is a schematic view of a state in which the one observer 2 observes the screen 15 as viewed from an upper surface of the display apparatus 100.

Here, a method of setting a range of a screen that the observer 2 can observe from an observation position as the main display region 5 will be described. Specifically, a region sandwiched by tangent lines drawn on the outer circumferential surface 17 of the screen 15 from the left and right eyes of the observer 2 in a plane (XY-plane) orthogonal to the center axis O of the screen 15 is set as the main display region 5.

Hereinafter, an angle representing a directional range that defines the main display region 5 will be referred to as a display angle θ. As shown in FIG. 6A, the display angle θ is an angle formed by respective points of tangency of the tangent lines drawn on the outer circumferential surface 17 from the left and right eyes and the center axis O.

In FIG. 6B, the main display region 5 defined by the display angle θ is illustrated. The display angle θ is an angle representing the width of the main display region 5. Therefore, a region whose direction angle range centered at the observation direction is the display angle θ is set as the main display region 5.

FIGS. 7A and 7B are schematic views showing an example of a method of calculating the display angle α In FIGS. 7A and 7B, a positional relationship between the left eye and the right eye of the observer 2 and the screen 15 in the XY-plane is schematically illustrated. Here, positions (observation positions) of the left eye and the right eye of the observer 2 are denoted by E1 and E2, respectively.

FIG. 7A is a schematic view showing a directional range α of the screen 15 that is visible from one eye of the observer 2. In FIG. 7A, the directional range α viewed from the observation position (E2) of the right eye is illustrated using the arrow. The directional range α is an angle formed by respective points of tangency of two tangent lines drawn on the outer circumferential surface 17 of the screen 15 from the one eye of the observer 2 in the XY-plane and the center axis O.

FIG. 7B is a schematic view showing a congestion angle β as the screen 15 is viewed with both eyes of the observer 2. In FIG. 7B, the congestion angle β is illustrated using the arrow. The congestion angle β is an angle formed by the observation positions (E1 and E2) of the both eyes of the observer 2 and the center axis O in the XY-plane.

The display angle θ shown in FIG. 6A is expressed using the directional range α and the congestion angle β. That is, it can be expressed as θ/2=(α/2+β/2). In the present embodiment, the display angle θ is calculated by using this relationship.

Specifically, assuming that D denotes a diameter of the outer circumferential surface 17, Lv denotes an observation distance (viewing distance) from the center axis O of the outer circumferential surface 17 to the observation position, Le denotes a distance between the left and right eyes of the observer 2, and θ denotes a display angle that is the directional range that defines the main display region 5, the display angle θ is calculated in accordance with Expression (1) below.

[Formula 1]

$$\frac{\theta}{2} = \cos^{-1}\left(\frac{D/2}{\sqrt{L_v^2 + \left(\frac{L_e}{2}\right)^2}}\right) + \tan^{-1}\left(\frac{L_e/2}{L_v}\right) \quad \text{Expression (1)}$$

Here, a design value of the actual screen 15 or the like is used as the diameter D of the outer circumferential surface 17. Moreover, as the observation distance Lv, a distance to the observer 2 detected by the motion sensor 12 may be used or a viewing distance or the like assumed when using the display apparatus 100 may be used. As the distance Le between the left and right eyes, for example, a user's input value may be used or a default value (e.g., 65 mm) may be used.

The angle expressed as an arccosine function ($\cos^{-1}$) on the right-hand side of Expression (1) is α/2 and is a term corresponding to the directional range α. Moreover, the angle expressed as an arctangent function ($\tan^{-1}$) is β/2 and is a term corresponding to the congestion angle β.

In this manner, in the present embodiment, the main display region 5 (display angle θ) is set on the basis of the directional range α of the screen 15 that is visible from the one eye of the observer 2 and the congestion angle β as the screen 15 is viewed with both eyes of the observer 2.

Accordingly, it is possible to reliably set the main display region 5 in the range that the observer 2 can observe. Moreover, it is possible to avoid a situation where the main image 7 is displayed in a range that the observer 2 cannot view and to extend the range in which the enhancement image 8 is displayed. As a result, effective presentation can be realized.

FIG. 8 is a graph showing a setting example of the display angle θ. In FIG. 8, a relationship between the display angle γ and the observation distance Lv, which is calculated in accordance with Expression (1), is shown. In the graph, the horizontal axis denotes the observation distance Lv and the vertical axis denotes the display angle θ. Here, the distance Le between the left and right eyes is set to be 65 mm. Moreover, in FIG. 8, data in cases where the diameter of the screen 15 is set to be D=100 mm, 200 mm, and 300 mm is respectively plotted.

For example, in a case where D=100 mm and Lv=300 mm, the display angle θ=173 degrees. Such settings of the main display range are effective in a case of viewing a desk display at a relatively short distance, for example. As a matter of course, the display angle θ can be calculated as appropriate even under other conditions.

For example, as the observation distance Lv increases, the display angle θ increases to be gradually closer to 180 degrees. In this case, approximately the entire plane of the front half of the screen 15 is the main display region 5 and the main image 7 is displayed largely. Accordingly, it is possible to display the main image 7 so that the main image 7 can be easily viewed.

On the other hand, as the observation distance Lv decreases, the display angle θ decreases. In particular, on the screen 15 having a larger diameter D, the range of the screen that is visible from the observer 2 who observes it at a short distance is narrower. In such a case, it is sufficient to display the main image 7 only in a region that the observer 2 can view and the enhancement image 8 can be displayed in the other region. Accordingly, it is possible to display necessary information in a suitable range and to improve the presentation effect.

A method of setting the main display region 5 is not limited to the above-mentioned method. For example, the range defined by the display angle θ calculated in accordance with Expression (1) may be adjusted.

For example, it is also possible to voluntarily set the main display region 5 to be narrower. In this case, it is possible to set the sub-display region 6 to be wider, and the enhancement image 8 is larger. For example, in a case where a visual field angle of the screen 15 (an angular range in which diffused light is visible) is narrower, the visual field angle can be limited. For example, the screen 15 using the HOE has a visual field angle of about 90 degrees, and it may be difficult to observe an image near the sides of the screen 15 as viewed from the observer 2.

In a case where the visual field angle of the screen is narrower in this manner, the main display region 5 may be set to be narrower. For example, on the basis of a limitation imposed by the visual field angle, the main display region 5 is set using an angle in which display of diffused light is visible actually as the upper limit. In this case, the sub-display region 6 (enhancement image 8) is wider, and it is possible to further increase the illumination effect (range).

Moreover, it is not necessarily necessary to limit the sub-display region 6 in which the enhancement image 8 is displayed to be in the range invisible from the observer 2. For example, it is also possible to add a video presentation effect like framing by setting the sub-display region 6 (enhancement image 8) to be wider so as to voluntarily show its small part to the observer 2.

Moreover, the main display region 5 and the sub-display region 6 may be set to partially overlap each other. In this case, output image data is generated so that an image of a portion in which the main image 7 and the enhancement image 8 overlap each other changes gradually by gradation or the like. Accordingly, it is possible to make a portion at which the main image 7 shifts to the enhancement image 8 unremarkable, and it is possible to natural direction without discomfort.

Moreover, for example, it is also possible to voluntarily set the main display region 5 to be wider. In this case, the sub-display region 6 is set to be narrower and the enhancement image 8 is set to be narrower.

For example, in a case where the response speed and accuracy in detecting the position (direction) of the observer 2 are lower, the main display region 5 is set to be narrower. Accordingly, it is possible to sufficiently avoid a situation where the enhancement image 8 is visible to the observer 2.

Moreover, the main display region 5 may be set in accordance with the distance (observation distance Lv) to the observer 2. That is, the main display region 5 may be set to actively change in accordance with the observation distance Lv. In this case, in a case where the observer 2 moves closer to it, the main display region 5 is set to be narrower, and in a case where the observer 2 moves away from it, the main display region 5 is set to be wider. At this time, the sub-display region 6 is set as appropriate in accordance with a change of the main display region 5. Accordingly, it is possible to constantly perform optimal presentation depending on the observation distance Lv.

Figure 9A:
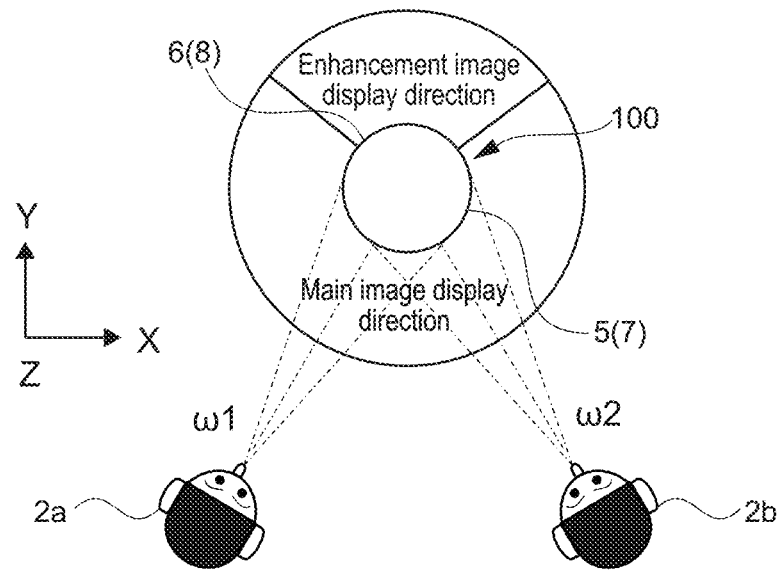
FIGS. 9A and 9B A schematic view for describing a main display region set for a plurality of observers.
Figure 9B:
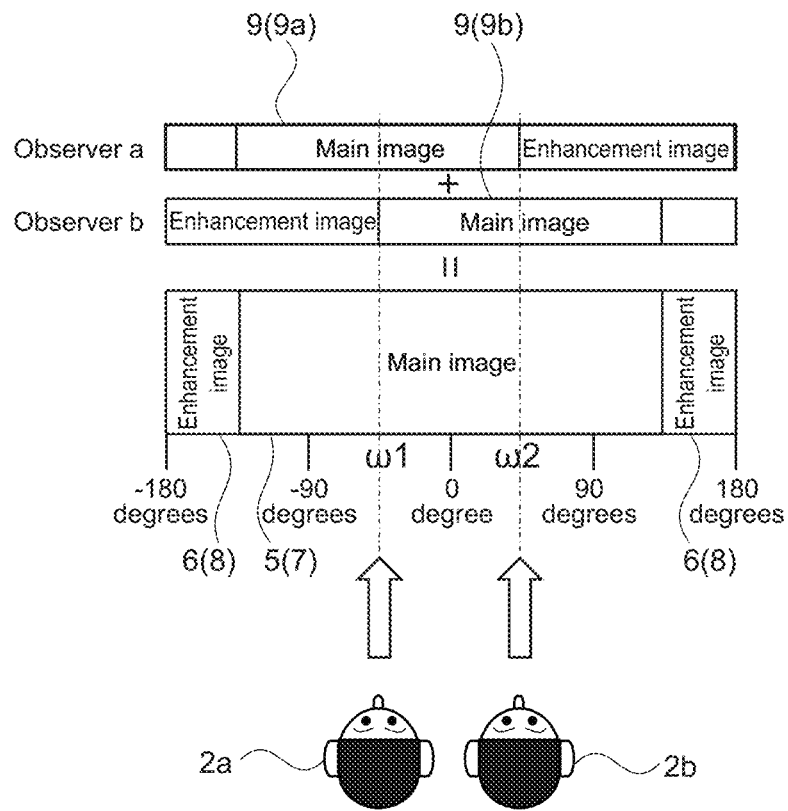

FIGS. 9A and 9B is a are schematic views for describing a main display region 5 set for a plurality of observers. Hereinabove, the case where the main display region 5 is set for the one observer 2 has been mainly described. Here, a method setting the main display region 5 in a case where two or more observers 2 are present will be described. FIG. 9A is a schematic view of a state in which two observers 2a and 2b observe the screen 15 as viewed from the upper surface of the display apparatus 100. FIG. 9B is a schematic view showing an example of a main display region 5 set for the two observers 2a and 2b. It should be noted that in FIG. 9B, the main display region 5 and the sub-display region 6 are expressed using absolute directions based on the display apparatus 100.

In the present embodiment, the motion sensor 12 is capable of detecting the plurality of observers 2 simultaneously. For example, in a case where the plurality of camera sensors 18 is used as the motion sensor 12, an image captured by each camera sensor 18 is output to the human detection processing unit 31 in real time. Accordingly, it is possible to simultaneously detect the plurality of observers 2. At this time, the human detection processing unit 31 estimates each of the absolute directions of the respective observers 2.

In FIG. 9A, an observation direction of the observer 2a on the left-hand side in the figure is estimated as $\omega 1$ in the absolute direction and an observation direction of the observer 2b on the right-hand side in the figure is estimated as $\omega 2$ in the absolute direction. The display region setting unit 32 respectively sets an individual region 9 visible from each observer 2 on the basis of each of the absolute directions $\omega 1$ and $\omega 2$.

The individual regions 9 are set by a method similar to that of the main display region 5 set for the one observer 2 (e.g., the method described with reference to FIGS. 6A, 6B, 7A, and 7B). That is, it can be said that the individual regions 9 are regions for displaying the main image 7 to the respective observers 2.

In FIG. 9B, individual regions 9a and 9b set for the observer 2a and the observer 2b are schematically illustrated as ranges in the absolute directions, respectively. The individual region 9a of the observer 2a is a range centered at $\omega 1$ and the individual region 9b of the observer 2b is a range centered at $\omega 2$.

In the present embodiment, the display region setting unit 32 sets a region that is a sum set of the individual regions 9a and 9b respectively calculated for the observer 2 in this manner as the main display region 5. That is, the main display region 5 is set so that portions (the individual regions 9) for displaying the main image 7 to the respective observers 2 are in a logical OR relationship.

Therefore, in FIG. 9B, a directional range including both the entire directional range of the individual region 9a and the entire directional range of the individual region 9b is set as the main display region 5. In this case, the main display region 5 includes a directional range in which the individual regions 9a and 9b overlap each other and a directional range in which the individual regions 9a and 9b do not overlap each other.

In this manner, in the present embodiment, the display region setting unit 32 calculates the plurality of individual regions 9 as regions on the screen 15 visible from the plurality of observers 2 and sets the region that is the sum set of the plurality of individual regions 9 as the main display region 5.

Moreover, once the main display region 5 is set, the sub-display region 6 is set as appropriate in the other region.

Accordingly, even in a case where the plurality of observers 2 is present, it is possible to properly display the main image 7 that should be shown to each observer 2. Moreover, for example, it is possible to set the sub-display region 6 in a portion or the like invisible from all the observers 2. Accordingly, it is possible to realize presentation or the like without discomfort without directly showing the enhancement image 8 and the like.

It should be noted that even in a case where there is a plurality of observers 2, it is possible to adjust the main display region 5 and the sub-display region 6 as appropriate by the above-mentioned method.

FIGS. 10A, 10B, 10C, 10D, 10E, and 10F is a are schematic views showing a setting example of the main display region and the sub-display region.

Figure 10A:
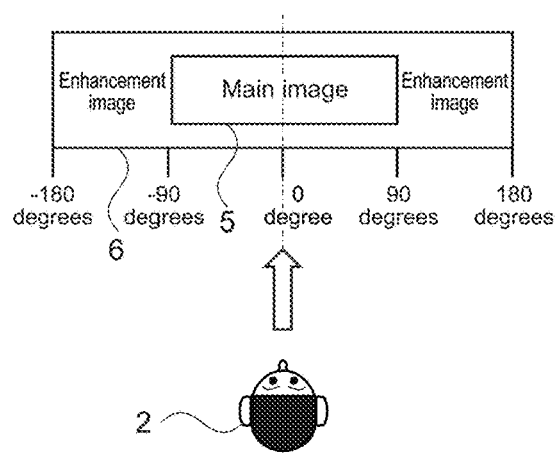
FIGS. 10A, 10B, 10C, 10D, 10E, and 10F A schematic view showing a setting example of a main display region and a sub-display region.

In FIG. 10A, a rectangular region whose width in the upper and lower directions is narrower than the width of the screen 15 is set at the center portion as the main display region 5. Moreover, a region other than the main display region 5 is set as the sub-display region 6. Therefore, the enhancement image 8 is displayed on the upper side and the lower side in addition to the left-hand side and the right-hand side of the main display region 5 so as to surround the main display region 5. It should be noted that the sub-display region 6 may be set only on either the upper side or the lower side of the main display region 5.

Accordingly, it is possible to add the illumination effect also on a side that the observer 2 views, i.e., the front side as viewed from the observer 2, and it is possible to emphasize the presentation.

Figure 10D:
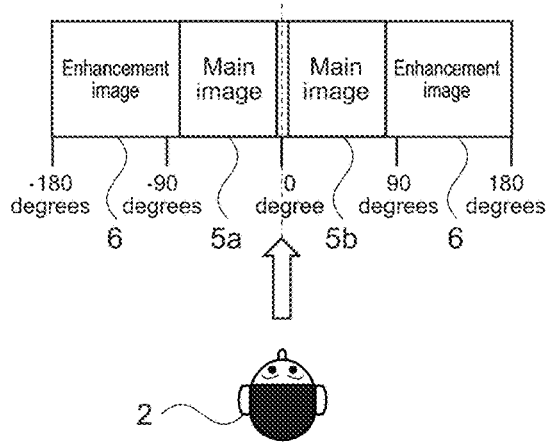
Figure 10B:
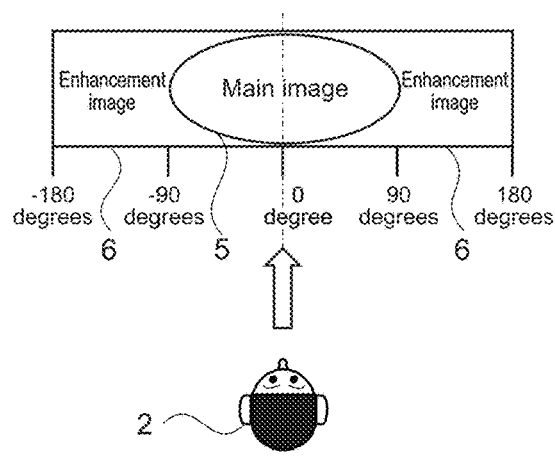

In FIG. 10B, an elliptical region is set as the main display region 5. Moreover, regions other than the main display region 5 are set as the sub-display regions 6. In this manner, the shape of the main display region 5 does not need to be rectangular. It should be noted that a horizontal width of the main display region 5 is set in accordance with Expression (1) or the like, for example.

By setting the shape of the main display region 5 in this manner, it is possible to realize an expression as if the picture (main image 7) was cut out, for example. Moreover, as in FIG. 10A, it is possible to add the illumination effect also on the front side as viewed from the observer 2.

Figure 10E:
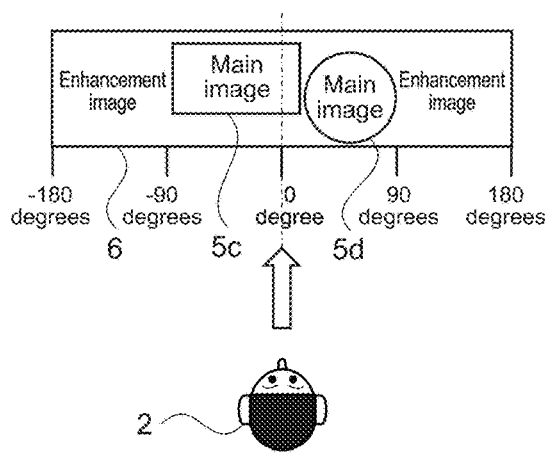
Figure 10C:
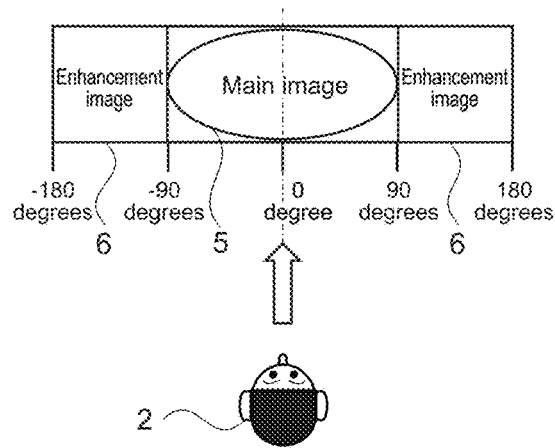

In FIG. 10C, an elliptical region is set as the main display region 5. Moreover, regions outside the directional range in which the main display region 5 is set are set as the sub-display regions 6. That is, the periphery of the elliptical main display region 5 is a black region in which the enhancement images 8 and the like are not displayed.

Accordingly, such an expression that the main image 7 is displayed remarkably can be realized. Moreover, since the observer 2 cannot directly view the enhancement image 8, natural presentation is possible.

It should be noted that the shape of the main display region 5 shown in FIGS. 10B and 10C are not limited to the elliptical shape and can be arbitrarily set.

In FIG. 10D, two rectangular regions (main display regions 5a and 5b) whose width in the upper and lower directions is the same as the width of the screen 15 are set in the directional range visible from the observer 2 as the main display regions 5. Moreover, regions other than the respective main display regions 5a and 5b are set as the sub-display regions 6. Different main images 7 (e.g., photograph and word information) are displayed in the main display regions 5a and 5b. In this manner, the plurality of main display regions 5 for displaying the main images 7 different from each other may be set in the directional range visible from the observer 2. It should be noted that the main display region 5 does not need to be set to be arranged horizontally, and for example, may be set to be arranged vertically.

Moreover, the plurality of sub-display regions 6 may be set for the main display regions 5, respectively. For example, a portion adjacent to the main display region 5 or a portion overlapping the main display region 5 is set as the sub-display region 6 associated with the main display region 5. In each sub-display region 6, the enhancement image 8 depending on the associated main image 7 is displayed.

In this manner, it is also possible to display different main images 7 on the left and right or upper and lower sides and to display the enhancement images 8 for effectively presenting them.

In FIG. 10E, a rectangular region (main display region 5c) whose width in the upper and lower directions is smaller than the width of the screen 15 and a circular region (main display region 5d) whose diameter is smaller than the width of the screen 15 are set in the directional range visible from the observer 2 as the main display regions 5. Moreover, a region other than the main display regions 5c and 5d is set as the sub-display region 6. In this manner, in a case where the plurality of main display regions 5 is set, the plurality of main display regions 5 may have different shape and size from each other.

Accordingly, it is possible to display a plurality of pieces of information (main images 7) with an effect added depending on the type and the like. Moreover, since the enhancement image 8 is displayed to fill a gap between the respective main display regions 5, it is possible to sufficiently provide the illumination effect.

Figure 10F:
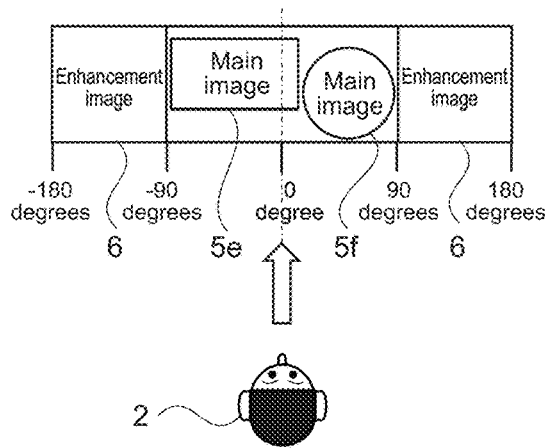

In FIG. 10F, as in FIG. 10E, a rectangular region (main display region 5e) and a circular region (main display region 5f) are set as the main display regions 5. Regions outside the directional range in which the main display regions 5e and 5f are set are set as the sub-display regions 6. That is, the periphery of the main display regions 5e and 5f is a black region in which the enhancement images 8 and the like are not displayed.

Accordingly, such an expression that the plurality of main images 7 is displayed remarkably can be realized. Moreover, it is possible to present the plurality of main images naturally effectively 7 by using the enhancement images 8 that the observer 2 cannot directly view.

In addition, a method of setting the main display region 5 and the sub-display region 6 is not limited.

[Setting of Position of Main Image] FIGS. 11A and 11B is a are schematic views showing a method of setting the position of the main image 7 in the output image data. FIG. 11A is an example of the main image data 20 stored in the storage unit 19. FIG. 11B is an example of output image data 21 generated by the display image generating unit 35. Here, a method of setting the position of the main image 7 will be described.

As shown in FIG. 11A, for example, in a main image of a building, a person, a character, or the like, a front position is set to the image itself in some cases. In these cases, in the main image data 20 that is original data about the main image 7, the front of the image is set to coincide with the front (absolute direction=0 degrees) of the display apparatus 100.

In a case where such main image data 20 is used without changing the position of the front, an image viewed in a direction other than the front is displayed in the main display region 5.

Therefore, in the present embodiment, zero-point adjustment of rotating the main image data 20 in accordance with the observation direction of the observer 2 is performed.

For example, as shown in FIG. 11B, in a case where the absolute direction w of the observer 2 is estimated, the image is rotated (slid) so that the front of the image coincides with the absolute direction 6). Therefore, the output image data 21 is an image in which the front of the main image 7 coincides with the observation direction. Accordingly, the observer 2 can observe the front of the main image 7 even in any direction.

It should be noted that for an image that does not require setting the front like an image of a bamboo forest, it is unnecessary to perform such zero-point adjustment. In this case, image display that changes in accordance with the observation direction is possible.

Figure 12A:
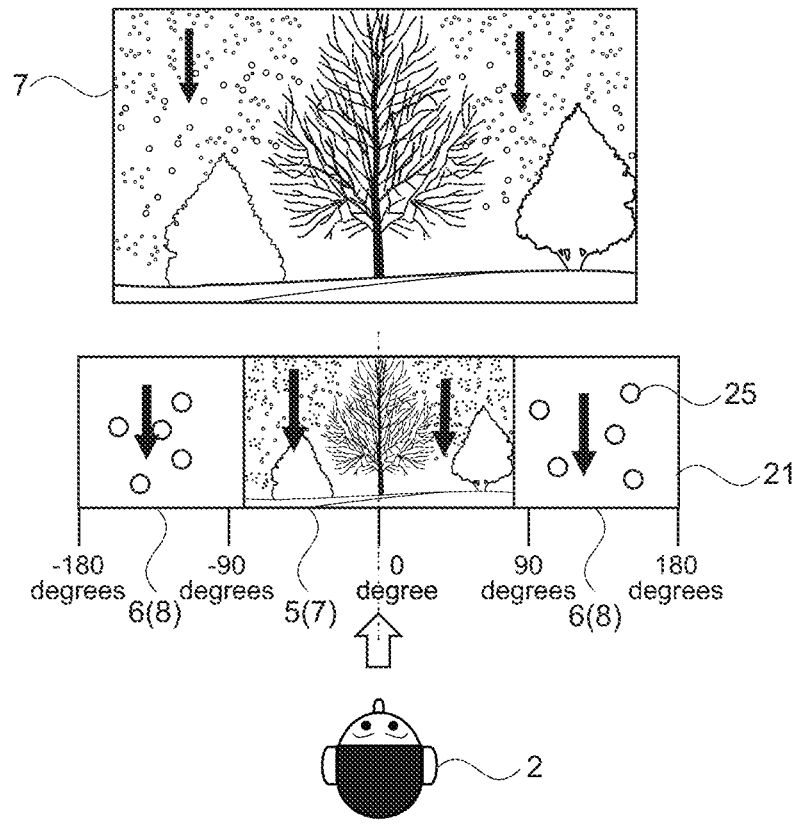
FIGS. 12A and 12B A schematic view for describing a method of generating an enhancement image.
Figure 12B:
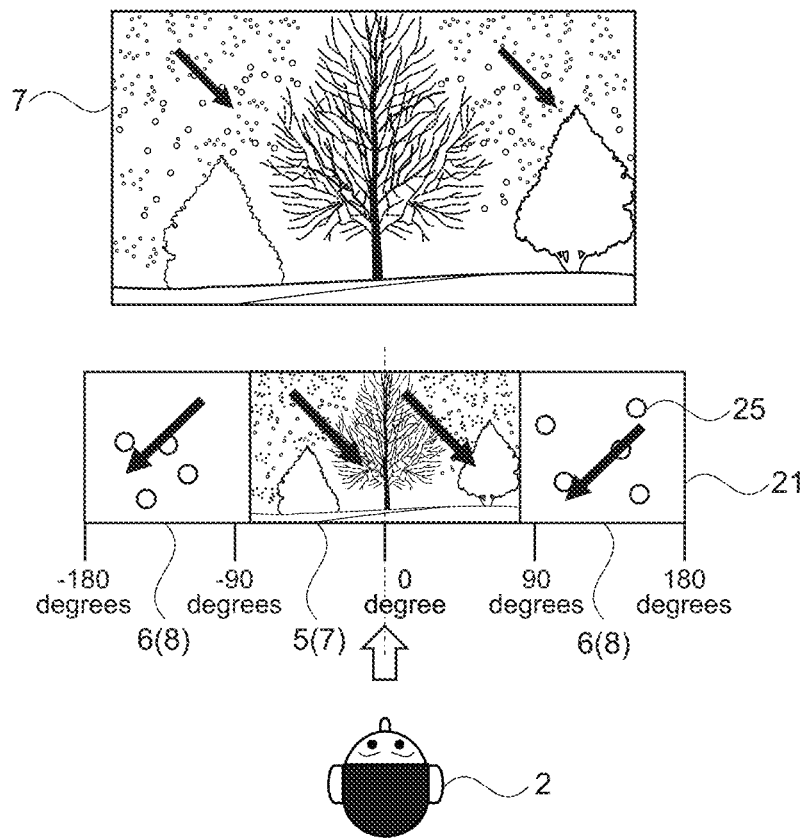

[Generation of Enhancement image] FIGS. 12A and 12B is a are schematic views for describing a method of generating an enhancement image. In FIG. 12A and FIG. 12B, the upper pictures are schematic views each showing the main image 7 and the lower pictures are schematic view each showing the output image data 21 including the main image 7 and the enhancement image 8. In FIGS. 12A and 12B, a video of a landscape in which snow falls is used as the main image 7.

In FIG. 12A, snow falls in the lower direction of the screen. In FIG. 12B, snow falls in the lower right direction of the screen.

Here, referring to FIG. 12A and FIG. 12B, a method of generating the enhancement image 8 that effectively presents the atmosphere in which snow falls will be described.

First of all, the feature extracting unit 33 extracts the feature amounts of the main image 7. For example, chromatic information (e.g., general colors) relating to the main image 7 is calculated. Moreover, for example, brightness information (e.g., a general average luminance) relating to the main image 7 is calculated. Moreover, for example, motion information (e.g., the movement direction and speed of the element (snow) moving on the screen) relating to the main image 7 is calculated.

Alternatively, information indicating that the main image 7 includes snow or information indicating that the main image 7 relates to a winter scene may be extracted on the basis of image recognition such as machine learning.

When features of the main image 7 (e.g., chromatic information, brightness information, motion information) are extracted, the enhancement image generating unit 34 generates an enhancement image 8 for all directions of 360 degrees depending on the main image 7.

Here, an image that effectively presents the atmosphere in which snow falls is generated. Specifically, a video in which a plurality of illumination elements 25 moves along a direction in which snow falls is generated as the enhancement image 8. In the enhancement image 8 each shown in FIGS. 12A and 12B, circular illumination elements 25 are used. It should be noted that the background of the illumination elements 25 is set to be in black, for example. Accordingly, presentation to move light balls (illumination) can be realized.

For example, the color and luminance of the illumination elements 25 are set on the basis of the chromatic information and the brightness information of the main image 7. Here, a color (e.g., white) similar to the snow color is set as the color of the illumination elements 25. Moreover, the brightness of the illumination elements 25 is set in accordance with the luminance of the main image 7. It should be noted that the color and luminance of the background of the illumination elements 25 and the like may be set using the chromatic information and the brightness information of the main image 7.

Moreover, for example, the movement direction of the illumination elements 25 is set on the basis of the motion information of the main image 7. For example, in the main image 7 shown in FIG. 12A, snow falls in the lower direction. In this case, an enhancement image 8 in which the illumination elements 25 move in the lower direction is generated. Accordingly, presentation to make light balls fall in the lower direction is possible.

Moreover, in the main image 7 shown in FIG. 12B, snow falls in the lower right direction. In this case, since the enhancement image 8 is displayed on the backside of the main image 7 as viewed from the observer 2, an enhancement image 8 in which the illumination elements 25 move in the lower left direction is generated. Accordingly, presentation to make light balls fall in the lower right direction like snow of the main image 7 is possible.

Moreover, since the screen 15 is the transparent screen, the image displayed on the screen 15 (enhancement image 8) on the backside is visible in a transparent state. Accordingly, it is possible to provide an overlapping effect with a depth and to further improve the video experience.

Additionally, it is possible to express high speed, for example, a landscape from a car window by moving and displaying the illumination elements 25. Moreover, it is also possible to express motion such as turn and swing of windmills, a wind chime, flame, or the like. Alternatively, by displaying a still image to rotate like a rotating paper lantern, it is also possible to move the enhancement image 8 in accordance with its rotation. In this case, the orientation of moving the enhancement image 8 (e.g., the illumination elements) may be the same as the orientation of the main image 7 or may be opposite to the orientation of the main image 7.

Moreover, in a case where the luminance rapidly changes like a thunder or spotlight, presentation to increase the luminance of the enhancement image 8 in accordance with the change in luminance is also possible.

In this manner, in the present embodiment, the enhancement image generating unit 34 generates the enhancement image 8 on the basis of at least one of the chromatic information, the brightness information, or the motion information regarding the main image 7. Accordingly, presentation using proper illumination suitable for the atmosphere of the main image 7 is possible.

As described above, in the display apparatus 100 according to the present embodiment, the image is displayed in the directional range larger than 180 degrees on the tubular screen 15. The observer 2 who observes this screen 15 is detected, and the main display region 5 visible from the observer 2 and the sub-display region 6 different from the main display region 5 are set on the basis of its detection result. Then, the main information (main image 7) displayed in the main display region 5 and the illumination information (enhancement image 8) of illumination light according to the sub-display region 6 are generated. Accordingly, it is possible to perform illumination or the like according to the position of the observer 2, for example, and it is possible to realize effective presentation depending on the observation direction.

As a method of adding an effect to the display of a flat display or the like, there is a technology of providing an illumination mechanism on the backside or the like for performing illumination depending on a video. In such a technology, a light source unit that illuminates surfaces on the backside of the flat display and the viewing side outside the screen is provided, and the light source unit is controlled by generating a light-emitting pattern (chromaticity, illuminance, etc.) on the basis of features of the video. Accordingly, an illumination space suitable for the video can be easily formed, and the sense of presence can be improved. Since the viewing direction is thus limited in the flat display, a portion on which illumination is performed (e.g., the backside and the viewing side) can be defined.

On the other hand, for example, in an apparatus capable of observation in multiple directions like a cylindrical display, the observation direction is not limited. For this reason, if illumination or the like is performed fixing a place to be illuminated like the flat display, it can obstruct the display.

In the present embodiment, as the region on the cylindrical screen 15, the main display region 5 in which the main image 7 that is the main content is displayed is set to be visible from the observer 2. At this time, with the main display region 5, the sub-display region 6 in which the enhancement image 8 for adding an effect to the display of the main image 7 is displayed is set in a region or the like invisible from the observer 2, for example. That is, the display range of the image (enhancement image 8) that generates illumination light is set in accordance with the position of the observer 2.

In this manner, the present technology can realize effective video presentation without lowering the visibility of the main image 7 by detecting the direction in which the observer 2 is located, displaying the main image 7 on the side of the observer 2, and displaying the enhancement image 8 on the opposite side on the cylindrical screen 15 where the observation direction is not limited.

Second Embodiment

A display apparatus according to a second embodiment of the present technology will be described. Hereinafter, descriptions of portions of the display apparatus 100, which have configurations and actions similar to those described in the above-mentioned embodiment, will be omitted or simplified.

Figure 13:
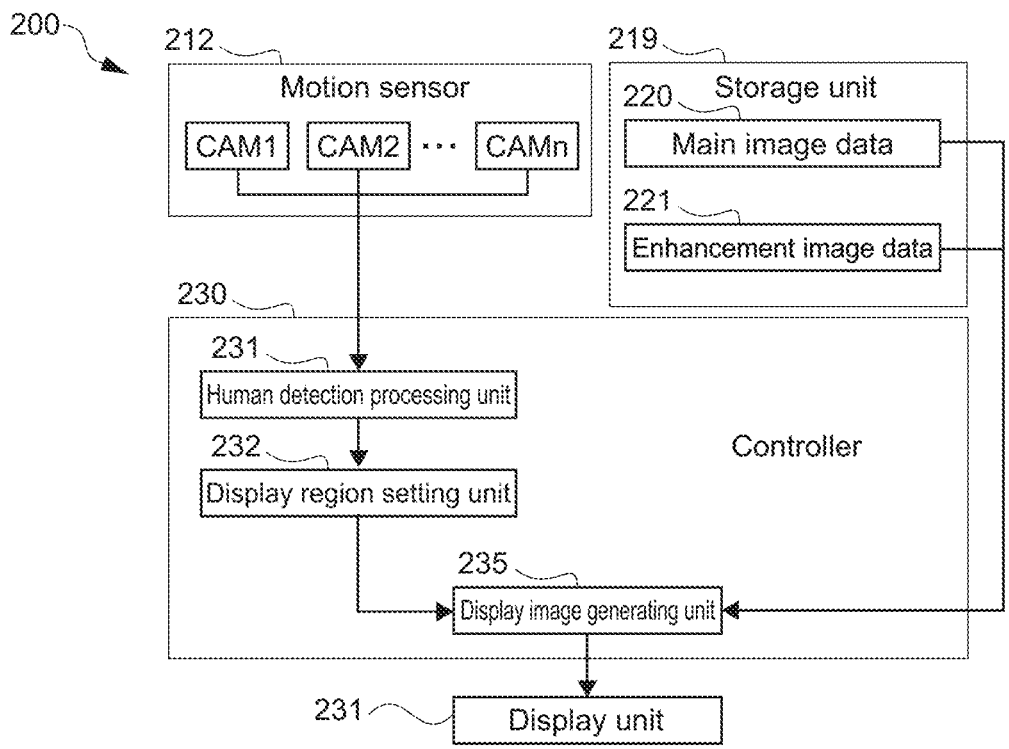
FIG. 13 A block diagram showing a functional configuration example of a display apparatus according to a second embodiment.

FIG. 13 is a block diagram showing a functional configuration example of a display apparatus according to a second embodiment. A display apparatus 200 uses data (enhancement image data 221) of an enhancement image 8 prepared in advance.

The display apparatus 200 includes a display unit 211, a motion sensor 212, a storage unit 219, and a controller 230. The display unit 211 and the motion sensor 212 are configured, for example, in a manner similar to that of the display unit 11 and the motion sensor 12 described with reference to FIGS. 1A 1B and 4 and the like.

The storage unit 219 stores main image data 220 and the enhancement image data 221. The main image data 220 is image data that is a main image 7 to be displayed in a main display region 5. The enhancement image data 221 is image data that is an enhancement image 8 to be displayed in a sub-display region 6.

In the present embodiment, the enhancement image data 221 (enhancement image 8) associated with the main image data 220 (main image 7) is generated in advance and stored in the storage unit 219. For example, as the enhancement image 8 associated with the main image 7 that displays a landscape of a bamboo forest, image data including green illumination light is stored. Moreover, an image (video) in which a plurality of illumination elements moves in accordance with a direction in which snow falls is stored, for example, as the enhancement image 8 associated with the main image 7 that displays a landscape in which snow falls.

The controller 230 includes a human detection processing unit 231, a display region setting unit 232, and a display image generating unit 235 as functional blocks. Configurations of the human detection processing unit 231, the display region setting unit 232, and the display image generating unit 235 are approximately similar to those of the human detection processing unit 31, the display region setting unit 32, and the display image generating unit 35 described with reference to FIG. 4, for example.

For example, the display image generating unit 235 reads the main image data 220 and the enhancement image data 221 from the storage unit 219 and generates output image data. In this manner, in the present embodiment, the enhancement image 8 associated with the main image 7 is read. Therefore, the display apparatus 200 does not perform processing and the like of generating the enhancement image 8 in accordance with the main image 7.

Accordingly, it is possible to reduce the processing load of the controller 230 and to improve the processing speed. Moreover, it is possible to reliably realize proper presentation processing by preparing the enhancement image 8 proper for the main image 7 in advance.

Third Embodiment

Figure 14:
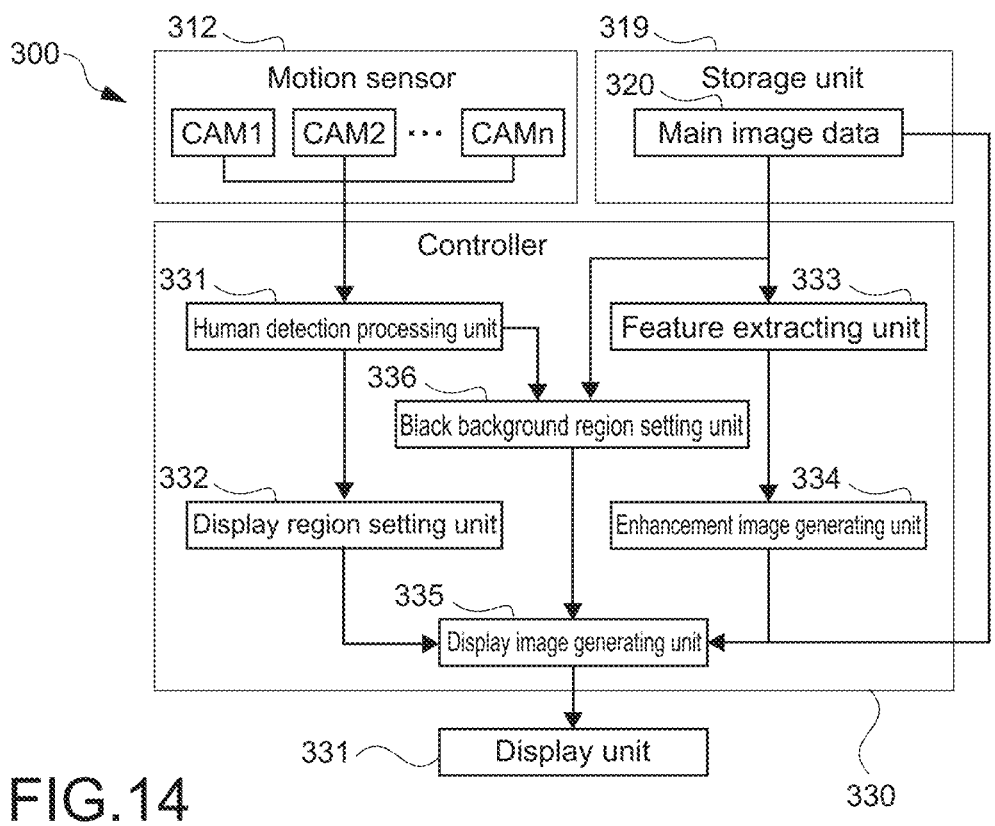
FIG. 14 A block diagram showing a functional configuration example of a display apparatus according to a third embodiment.

FIG. 14 is a block diagram showing a functional configuration example of a display apparatus according to a third embodiment. A display apparatus 300 performs black background processing on the enhancement image 8.

The display apparatus 300 includes a display unit 311, a motion sensor 312, a storage unit 319, and a controller 330. The display unit 311, the motion sensor 312, and the storage unit 319 are configured, for example, in a manner similar to that of the display unit 11, the motion sensor 12, and the storage unit 19 described with reference to FIGS. 1A 1B and 4 and the like.

The controller 330 includes, as functional blocks, a human detection processing unit 331, a display region setting unit 332, a feature extracting unit 333, an enhancement image generating unit 334, a display image generating unit 335, and a black background region setting unit 336. Configurations of the respective parts excluding the black background region setting unit 336 are approximately similar to those of the functional blocks described with reference to FIG. 4, for example.

The black background region setting unit 336 sets a black background region that is a target on which black background processing is performed.

Here, the black background processing is processing of lowering the luminance of the enhancement image 8 in accordance with a region in which a display object included in the main image 7 is displayed. By this black background processing, the enhancement image 8 is displayed to be partially darker in accordance with the display object in the main image 7.

For example, with a transparent cylindrical screen, since a video on the back surface can be seen therethrough or reflection light of the enhancement image 8 can be seen therethrough, it may be difficult to view the main image 7 displayed on a surface visible from an observer 2 (e.g., the contrast may lower). For this reason, it is possible to improve the visibility of the display object by displaying a part of the enhancement image 8 to be darker in accordance with the position of the main image 7 and the position of the observer 2.

On the basis of the positional information of the main image 7 and the observer 2, the black background region setting unit 336 calculates a region on the backside of the screen 15 that overlaps the display object as viewed from the observer 2. A region that overlaps this display object is set as the black background region that is the target of the black background processing.

Specifically, the size of the black background region is set on the basis of the size of the display object included in the main image 7. Moreover, the position of the black background region is set on the basis of the position of the observer 2.

Figure 15A:
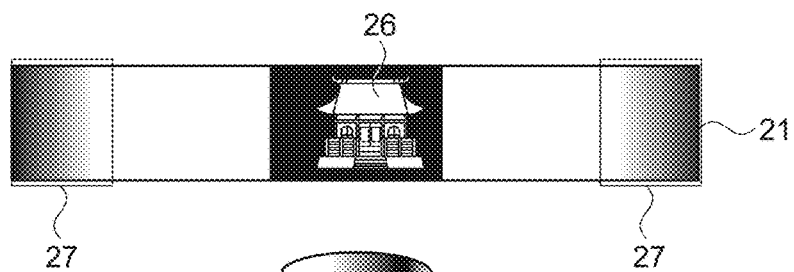
FIGS. 15A, 15B, and 15C A schematic view showing a display example of the main image using black background processing.
Figure 15B:
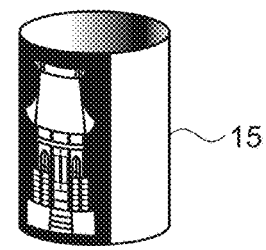
Figure 15C:
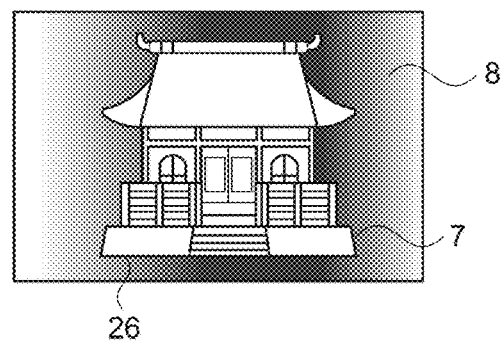

FIGS. 15A, 15B, and 15C is a are schematic views showing a display example of the main image using the black background processing. In FIGS. 15A, 15B, and 15C, the main image 7 including a building as a display object 26 is used.

FIG. 15A is a schematic view showing output image data 21 in which black background regions 27 are set. For example, in a case where an observation direction 3 of the observer 2 corresponds to a direction of the center of the output image data 21, as shown in FIG. 15A, the main image 7 (main display region 5) is arranged at the center of the output image data 21. In this case, regions on the backside of the main image 7 (display object 26) are regions at both ends in the output image data 21. These regions at both ends are set as the black background regions 27.

Information about the set black background regions 27 is output to the display image generating unit 35, for example, and the luminance of the enhancement image 8 included in the black background regions 27 is lowered. It should be noted that the enhancement image generating unit 334 may perform this processing.

In this manner, in the present embodiment, the enhancement image 8 sets the luminance of the portion that overlaps the display object 26 included in the main image 7 to be lower than the luminance of the other portion.

In the example shown in FIG. 15A, the luminance is lowered so that the enhancement image 8 is sufficiently darker in a portion just behind the display object as viewed in the observation direction (e.g., a portion at ±180 degrees with respect to the observation direction). It should be noted that gradation is set so that the luminance is gradually darker in the vicinity of a boundary between the black background regions 27 and the normal region. Accordingly, it is possible to avoid a situation where the luminance lowers unnaturally.

FIG. 15B is a perspective view of the screen 15 on which the output image data 21 subjected to the black background processing is displayed. As shown in FIG. 15B, the luminance lowers on the opposite side on which the display object 26 is displayed. FIG. 15C is an image diagram of the main image 7 displayed using the black background processing. By performing the black background processing for lowering the luminance of the background, it is possible to increase the contrast of the display object 26 (main image 7) displayed in the front.

Figure 16A:
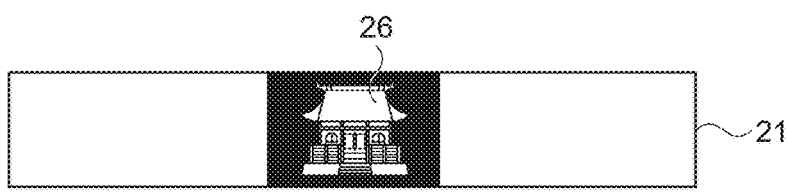
FIGS. 16A, 16B, and 16C A schematic view showing a display example of the main image as a comparative example.
Figure 16B:
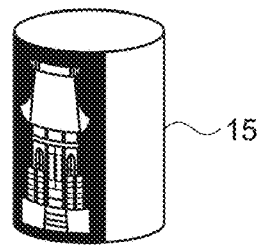
Figure 16C:
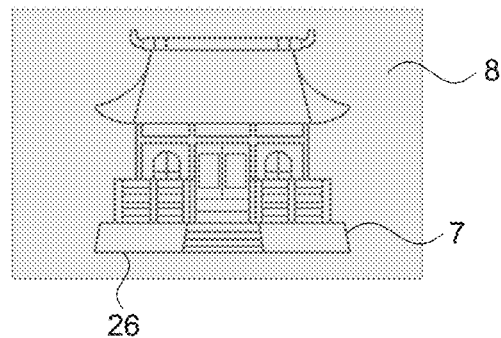

FIGS. 16A, 16B, and 16C are schematic views showing a display example of the main image as a comparative example. As shown in FIG. 16A and FIG. 16B, the black background processing is not performed here. In this case, the region that overlaps the display object 26 is displayed with a brightness similar to that of the other enhancement image 8. As a result, as shown in FIG. 16C, the display image 8 (main image 7) is displayed to be brighter generally due to influence of light of the enhancement image 8 on the backside. Therefore, the contrast of the display object 26 may lower.

In contrast, in the present embodiment, by performing the black background processing, it is possible to clearly display the contents of the main image 7 (display object 26) that should be displayed to the observer 2. Moreover, in the region on which the black background processing is performed, the enhancement image 8 is displayed with normal luminance. Accordingly, it is possible to realize various presentation effects while increasing the contrast.

Fourth Embodiment

Figure 17:
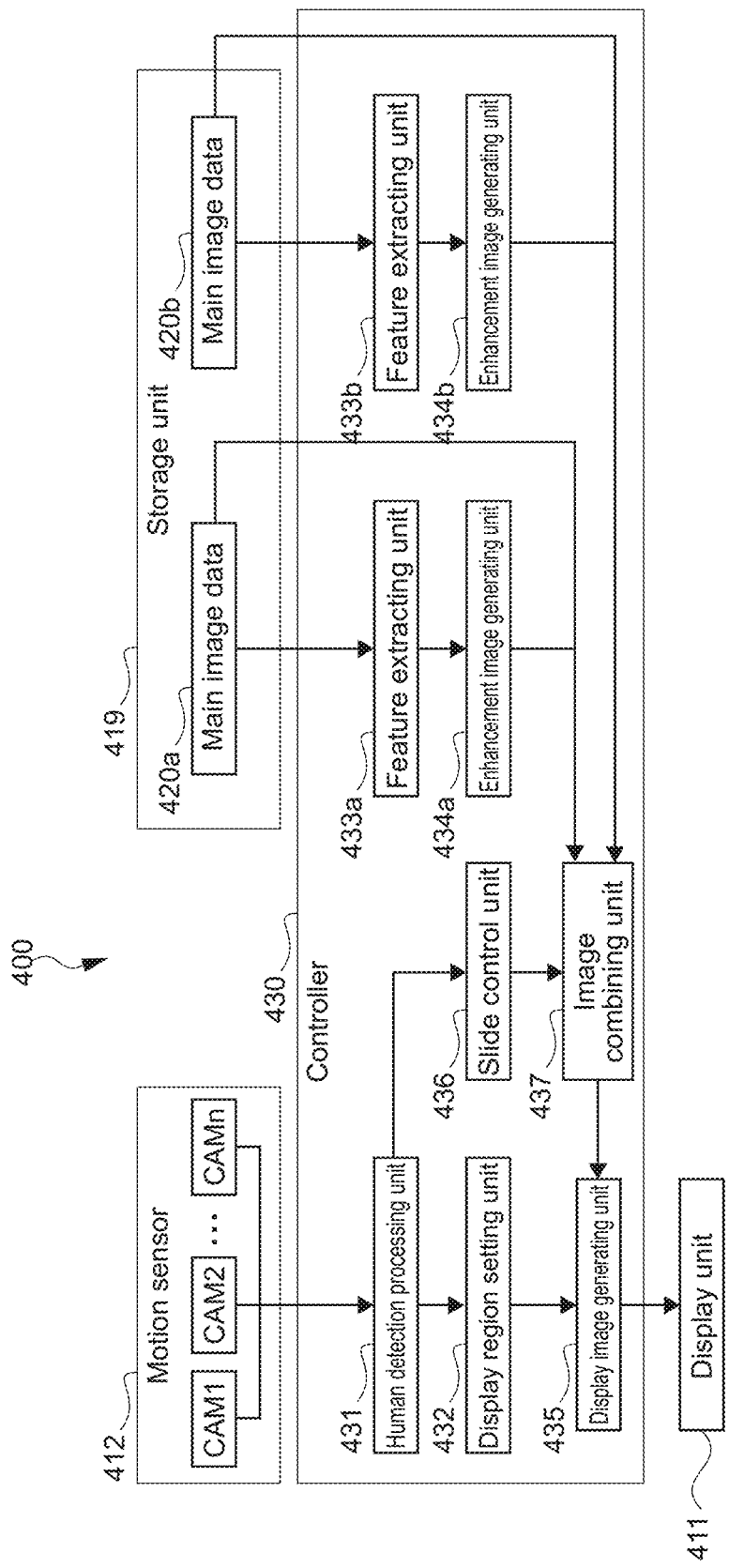
FIG. 17 A block diagram showing a functional configuration example of a display apparatus according to a fourth embodiment.

FIG. 17 is a block diagram showing a functional configuration example of a display apparatus according to a fourth embodiment. A display apparatus 400 performs slide processing of switching an image displayed on a screen 15 while sliding it.

The display apparatus 400 includes a display unit 411, a motion sensor 412, a storage unit 419, and a controller 430. The display unit 411 and the motion sensor 412 are configured, for example, in a manner similar to that of the display unit 11 and the motion sensor 12 described with reference to FIGS. 1A 1B and 4 and the like.

The storage unit 419 stores main image data 420a and 420b. The main image data 420a is image data of the main image 7a displayed in a main display region 5 before the slide processing is performed. The main image data 420b is image data of the main image 7b newly displayed in the main display region 5 by the slide processing. The storage unit 419 stores the plurality of pieces of main image data in this manner. In the slide processing, it is possible to switch any main image data stored in the storage unit 419.

The controller 430 includes, as functional blocks, a human detection processing unit 431, a display region setting unit 432, feature extracting units 433a and 433b, enhancement image generating units 434a and 434b, a display image generating unit 435, a slide control unit 436, and an image combining unit 437. The human detection processing unit 431 and the display region setting unit 432 of these functional blocks are configured in a manner approximately similar to that of the functional blocks described with reference to FIG. 4, for example.

The feature extracting units 433a and 433b read the main image data 420a and 420b and extract feature amounts of the main images 7a and 7b, respectively. The enhancement image generating units 434a and 434b generate enhancement images 8a and 8b depending on the main images 7a and 7b on the basis of the feature amounts of the main images 7a and 7b, respectively. Such processes are performed in parallel during execution of the slide processing, for example.

The slide control unit 436 controls movement of the switching line when switching the image in the slide processing. The switching line is a boundary between an image displayed already and an image to be displayed newly. In the slide processing, the image switching is performed while moving the switching line along the screen 15.

The slide control unit 436 sets an initial position of the switching line on the basis of the positional information of the observer 2. Moreover, the slide control unit 436 sets the movement speed, the movement direction, and the like of the switching line.

In this manner, the slide control unit 436 controls the switching line of switching the main image 7 and the enhancement image 8 to next images respectively by moving along the screen 15.

On the basis of the position of the switching line, the image combining unit 437 generates an image (composite main image) combining the main image 7a and the main image 7b and an image (composite enhancement image) combining the enhancement image 8a and the enhancement image 8b.

The composite main image is an image obtained by combining, in the directional range of 360 degrees, the main image 7b with a portion in which the switching line is already moved (a portion in which the image is switched) and combining the main image 7a with the other portion. Moreover, the composite enhancement image is an image obtained by combining, in the directional range of 360 degrees, the enhancement image 8b with a portion in which the switching line is already moved and combining the enhancement image 8a with the other portion.

Therefore, the movement of the switching line switches the composite main image from the main image 7a to the main image 7b and also switches the composite enhancement image from the enhancement image 8a to the enhancement image 8b.

The display image generating unit 435 generates output image data on the basis of the composite main image and the composite enhancement image that are generated by the image combining unit 437. Specifically, the output image data is generated in the main display region 5 and the sub-display region 6 set by the display region setting unit 432 so as to display the composite main image and the composite enhancement image. Accordingly, using the switching line as the boundary, it is possible to display a state in which the images (the main image 7a and the enhancement image 8a) displayed before the slide processing are switched to the new images (the main image 7b and the enhancement image 8b) while sliding. Hereinafter, the composite main image and the composite enhancement image may be simply referred to as the main image 7 and the enhancement image 8.

Figure 18A:
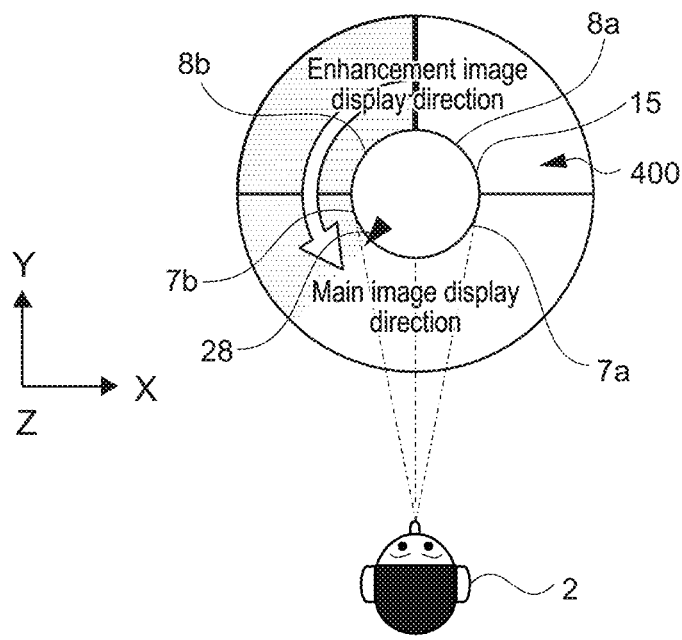
FIGS. 18A and 18B A schematic view showing an example of slide processing in the display apparatus.
Figure 18B:
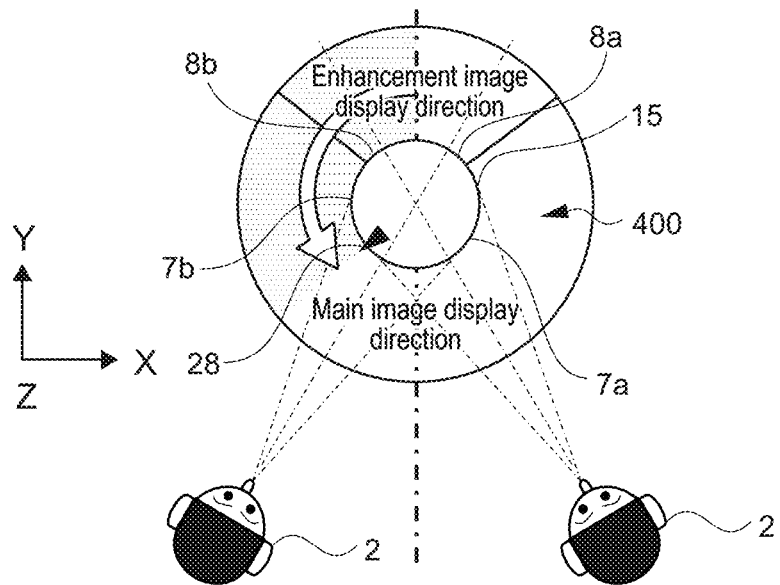

FIGS. 18A and 18B is a are schematic views showing an example of the slide processing in the display apparatus 400. Here, slide processing of moving one switching line 28 in the circumferential direction of the screen 15 and switching the image will be described. In this case, the enhancement image 8 is consecutively switched, not distinguished from the main image 7. In FIGS. 18A and 18B, the switching line 28 is schematically illustrated using the black triangle representing its position.

As shown in FIG. 18A, it is assumed that one observer 2 is observing the screen 15. Here, the slide control unit 436 sets the initial position of the switching line 28 to be the position (180 degrees as the relative direction) opposite to the screen 15 with respect to the position of the observer 2 (0 degrees as the relative direction). That is, the initial position of the switching line 28 is set to be the position invisible from the observer 2.

In this manner, in FIG. 18A, the switching is performed from the enhancement image 8 on the side opposite to the side that the observer 2 is viewing when the main image 7 is switched. Since the enhancement image 8 first starts switching, illumination light changes, which can inform the observer 2 of the switching timing of the main image 7.

It should be noted that although the start point of the switching (the initial position of the switching line 28) is the position invisible from the observer 2, it does not necessarily need to be just behind.

In the example shown in FIG. 18A, the switching line 28 is moved in the counterclockwise direction in the figure. In this case, the enhancement image 8a displayed on the left rear side of the screen 15 as viewed from the observer 2 is switched to the enhancement image 8b due to the movement of the switching line 28. Moreover, when the switching line 28 reaches the front left side as viewed from the observer 2, the main image 7a is switched to the main image 7b. As a result, the main image 7a is completely switched to the main image 7b in accordance with sliding of the switching line 28. Moreover, when the switching line 28 reaches the rear right side as viewed from the observer 2, the remaining enhancement image 8a is switched to the enhancement image 8b.

It should be noted that the portion in which the image is switched (a peripheral portion of the switching line 28) may be clearly divided or may smoothly change by gradation.

Moreover, as shown in FIG. 18B, it is assumed that a plurality of observers 2 is observing the screen 15. In this case, the initial position of the switching line 28 is set as appropriate to be the position (sub-display region) invisible from each observer 2. In FIG. 18B, the switching line 28 is set to be at a position furthest from the two observers 2, and slide processing of moving the switching line 28 in the counterclockwise direction is performed.

In this manner, in the present embodiment, the initial position of the switching line 28 is set to be the position invisible from the observer 2, and the main image 7 and the enhancement image 8 are consecutively switched by moving the switching line 28 in the circumferential direction of the screen 15.

Accordingly, the image switching starts from the position that the observer 2 cannot directly see. Therefore, display in which the main image 7 that the observer 2 is viewing is separated and switched in the middle is avoided, and an expression of switching the image as if the entire image was painted smoothly is possible.

Figure 19:
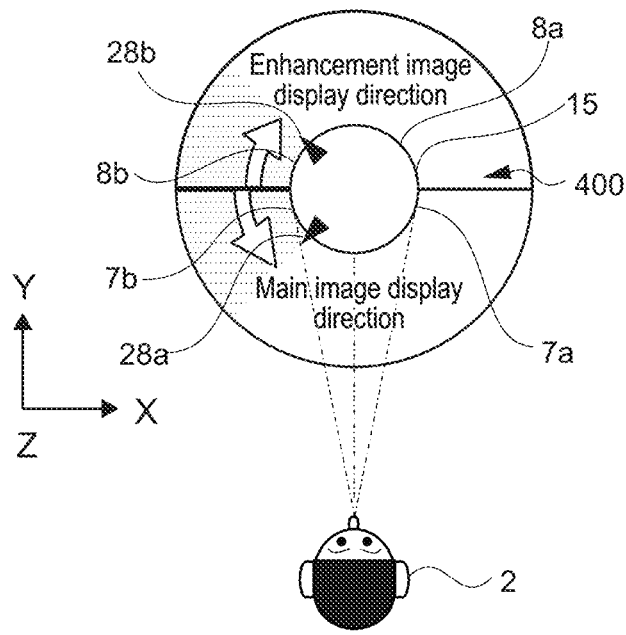
FIG. 19 A schematic view showing another example of slide processing in the display apparatus.

FIG. 19 is a schematic view showing another example of the slide processing in the display apparatus 400. Here, slide processing of moving two switching lines 28a and 28b in synchronization with each other in the circumferential direction of the screen 15 and switching the image will be described. In this case, when the main image 7 switches, the enhancement image 8 is switched to be synchronized with it.

Here, the switching line 28a is a line of switching the main image 7 and the switching line 28b is a line of switching the enhancement image 8. In the present embodiment, the switching line 28a corresponds to a first line and the switching line 28b corresponds to a second line.

As shown in FIG. 19, it is assumed that one observer 2 is observing the screen 15. Here, the slide control unit 436 sets initial positions of the switching lines 28a and 28b to be the same position. In FIG. 19, a position of a boundary between the main image 7 and the enhancement image (the main display region 5 and the sub-display region 6) on the left-hand side as viewed from the observer 2 is set to be the initial position of each of the switching lines 28a and 28b.

For example, the switching line 28a moves in the counterclockwise direction along the screen 15. Accordingly, the main image 7a is switched to the main image 7b from the left-hand side to the right-hand side as viewed from the observer 2. In this case, the switching line 28b moves in the clockwise direction along the screen 15 in synchronization with the switching line 28a. Accordingly, the enhancement image 8a is switched to the enhancement image 8b from the left-hand side to the right-hand side as viewed from the observer 2.

It should be noted that the movement speed of the switching lines 28a and 28b is set as appropriate so that the switching of the main image 7 and the enhancement image 8 ends simultaneously.

In this manner, in the present embodiment, the switching line 28a for switching the main image and the switching line 28b for switching the enhancement image 8 are used as the switching line 28. Moreover, the initial position of the switching lines 28a and 28b is set to be the position that is a boundary between the main image 7 and the enhancement image 8, and the main image 7 and the enhancement image 8 are synchronized and switched by simultaneously moving the switching lines 28a and 28b in the same movement direction as viewed from the observer 2.

Accordingly, presentation to change the display (main image 7) of the screen 15 and the illumination light (enhancement image 8) while sliding as a whole is possible.

It should be noted that in the slide processing of synchronizing and switching the main image 7 and the enhancement image 8 in this manner, the switching lines 28a and 28b may be slid in the upper and lower directions or oblique directions of the screen 15. Accordingly, various types of presentation can be realized.

Fifth Embodiment

Figure 20:
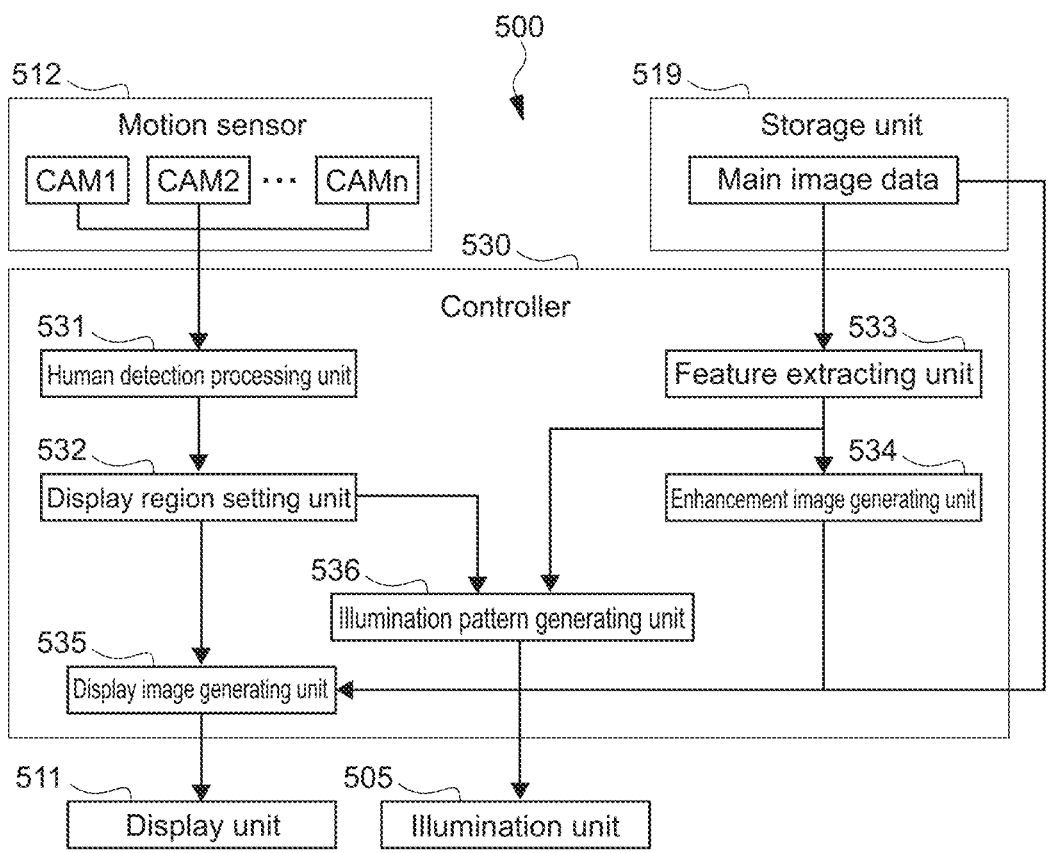
FIG. 20 A block diagram showing a functional configuration example of a display apparatus according to a fifth embodiment.
Figure 21:
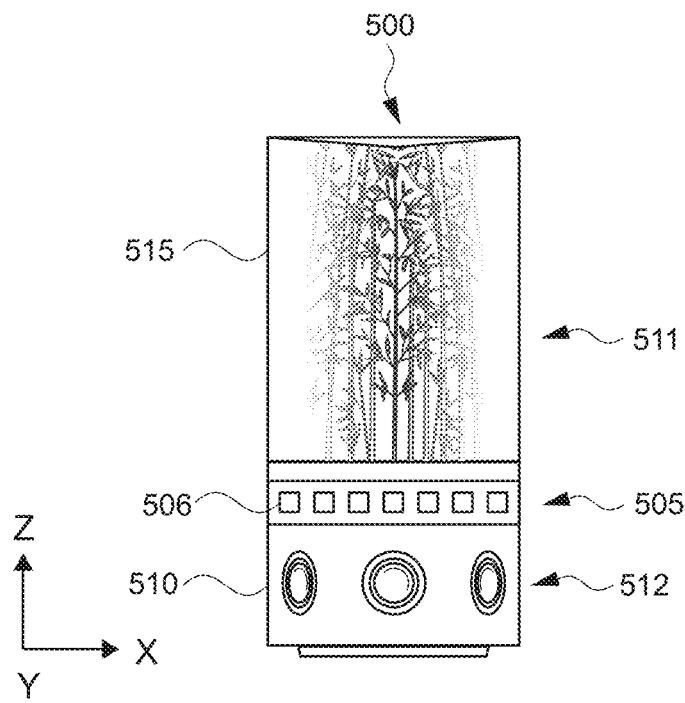
FIG. 21 A schematic view showing an outer appearance of the display apparatus.

FIG. 20 is a block diagram showing a functional configuration example of a display apparatus according to a fifth embodiment. FIG. 21 is a schematic view showing an outer appearance of a display apparatus 500.

In the present embodiment, the display apparatus 500 is provided with an illumination unit 505 that emits illumination light.

As shown in FIG. 20, the display apparatus 500 includes a display unit 511, a motion sensor 512, a storage unit 519, a controller 530, and an illumination unit 505. The display unit 511, the motion sensor 512, and the storage unit 519 are configured, for example, in a manner similar to that of the display unit 11, the motion sensor 12, and the storage unit 19 described with reference to FIGS. 1A 1B and 4 and the like.

As shown in FIG. 21, the illumination unit 505 includes a plurality of illumination devices 506 that emits illumination light to a periphery of the display apparatus 500. The respective illumination devices 506 are arranged along a side surface of a base unit 510. In FIG. 21, the plurality of illumination devices 506 arranged on an upper side of the motion sensor 512 (camera sensor) is schematically illustrated. In this manner, in the present embodiment, the plurality of illumination devices 506 is provided outside a screen 515.

For example, light-emitting elements such as LEDs are used as the illumination devices 506. Moreover, the illumination devices 506 may be a color light source that emits illumination light in any color or a mono-color light source and the like may be used.

The controller 530 includes, as functional blocks, a human detection processing unit 531, a display region setting unit 532, a feature extracting unit 533, an enhancement image generating unit 534, a display image generating unit 535, and an illumination pattern generating unit 536. The respective functional blocks of these functional blocks excluding the illumination pattern generating unit 536 are configured in a manner approximately similar to that of the functional blocks described with reference to FIG. 4, for example.

The illumination pattern generating unit 536 generates an illumination pattern for causing the illumination unit 505 (illumination devices 506) to emit light. The illumination pattern includes, for example, information for specifying a light-emitting range, a color, a luminance, a timing, and the like of illumination light. In the present embodiment, information about the illumination pattern is an example of the illumination information.

The illumination pattern generating unit 536 generates an illumination pattern in accordance with feature amounts of the main image 7 extracted by the feature extracting unit 533. Specifically, the color and luminance of illumination light are set in accordance with the color, the brightness, and the like of the main image 7. Moreover, the timing, rhythm, and the like for blinking illumination light are set on the basis of the motion information and the like of the main image 7.

Moreover, the illumination pattern generating unit 536 sets a light-emitting range for emitting illumination light on the basis of information about the main display region 5 and the sub-display region 6 ser by the display region setting unit 532. For example, a directional range in which the sub-display region 6 is set is set as the light-emitting range. The illumination devices 506 included in this light-emitting range emit illumination light. Information about the generated illumination pattern is output to the illumination unit 505. Then, the respective illumination devices 506 are driven in accordance with the illumination pattern.

Accordingly, it is possible to emit illumination light according to the sub-display region 6, and for example, presentation using illumination light that the observer 2 cannot view directly is possible. As a result, it is possible to realize a natural illumination effect.

In addition, a method of setting the light-emitting pattern and the like are not limited.

The presentation of illumination light by the illumination unit 505 is used with the illumination using the enhancement image 8. Accordingly, for example, even in a case where a sufficient enhancement effect cannot be obtained only with a video displayed on the screen 515, the general brightness and the like can be enhanced by the illumination light of the illumination unit 505. It should be noted that it is also possible to effectively present the main image 7 by using only either one of the illumination unit 505 and the enhancement image 8.

Sixth Embodiment

Figure 22:
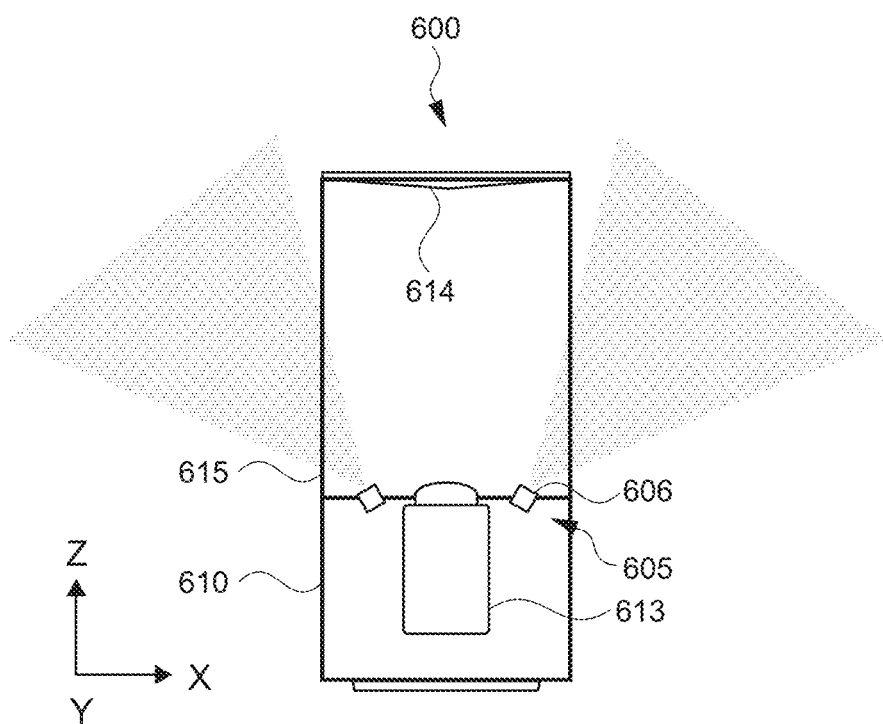
FIG. 22 A schematic cross-sectional view showing a configuration example of a display apparatus according to a sixth embodiment.

FIG. 22 is a schematic cross-sectional view showing a configuration example of a display apparatus according to a sixth embodiment.

A display apparatus 600 includes a base unit 610, an image projecting unit 613, a reflection mirror 614, a screen 615, and an illumination unit 605. In the display apparatus 600, the illumination unit 605 is provided inside the screen 615.

The screen 615 has a cylindrical shape and is a transparent screen that diffuses light entering in a predetermined direction (at a predetermined incident angle).

The screen 615 is typically configured using an HOE. As described with reference to FIGS. 1A and 1B, the HOE has characteristics to selectively diffract light entering at the predetermined incident angle. Here, image light emitted from the image projecting unit 613 is reflected by the reflection mirror 614 and enter the screen 615 at the predetermined incident angle. The screen 615 selectively diffuses image light reflected by the reflection mirror 614 and entering from diagonally above in this manner and emits them from the outer circumferential surface.

It should be noted that light entering the screen 615 at angles other than the predetermined incident angle is transmitted.

The illumination unit 605 includes a plurality of illumination devices 606. The respective illumination devices 606 are arranged on an upper surface of the base unit 610 so as to surround the entire periphery of an emission portion of the image projecting unit 613. For example, light-emitting elements such as LEDs are used as the illumination devices 606.

Moreover, the plurality of illumination devices 606 is respectively arranged, oriented to a diagonally upper portion outside the screen 615. Therefore, illumination light (hatched areas in the figure) emitted from the respective illumination devices 606 enters the screen 615 from diagonally below. In this manner, illumination light entering the screen 615 in a direction different from that of the image light transmits through the screen 615 without being diffused.

In this manner, the plurality of illumination devices 606 is provided inside the screen 615 so as to cause illumination light to enter the screen 615 in a direction different from the predetermined direction (predetermined incident angle).

Accordingly, it is possible to emit illumination light from the inside the screen 615 and illuminate the outer space of the display apparatus 600. Accordingly, for example, ceiling illumination and the like can be realized. Moreover, the light-emitting range of the illumination devices 606 is set as appropriate in accordance with the position of the observer 2. Accordingly, a natural illumination effect and the like can be realized.

Other Embodiments

The present technology is not limited to the above-mentioned embodiments, and various other embodiments can be made.

Hereinabove, the case where the transparent screen that transmits visible light is used as the display of the display apparatus has been mainly described. A specific configuration of the display is not limited. A transparent display configured using a transparent liquid crystal display (LCD), a transparent OLED, a transparent LED, or the like may be used.

Moreover, an opaque display that does not transmit visible light may be used as the display of the display apparatus.

For example, for projecting an image by using a projector (image projecting unit), a cylindrical screen or the like made of an opaque material is used as the display of the display apparatus. A transmissive-type diffusion screen made of a white material or the like is conceivable as such an opaque screen.

Moreover, an opaque display of spontaneous light-emitting type may be used as the display of the display apparatus. In this case, an LCD not having light transmittance, an OLED display or LED display not having light transmittance, or the like is used.

In this manner, even in a case where the opaque display is used, it is possible to provide natural presentation effect by setting the sub-display region in the portion (e.g., backside) invisible from the observer, for example, and displaying the enhancement image.

Hereinabove, the case where the cylindrical screen is used has been described. The screen shape is not limited to the cylindrical shape. For example, a screen having a prism-shape, a screen having an elliptical cross-section, or the like may be used. In this case, by setting the main display region and the sub-display region as appropriate in accordance with the screen shape, it is possible to display the main image in the region visible from the observer and perform the illumination by using the region invisible from the observer.

In addition, the screen shape is not limited, and a tubular screen in any shape whose directional range in which the image is displayed is larger than 180 degrees may be used.

Hereinabove, the case where the illumination is performed using the enhancement image that effectively presents the main image has been described. The present technology is not limited thereto, and for example, the enhancement image may be configured as an illumination image not related to the main image. In this case, for example, irrespective of the contents, the type, and the like of the main image, it is possible to perform constant illumination. It should be noted that the display positions of the main image and the illumination image are set as appropriate in accordance with the position of the observer. In this manner, the display apparatus can also be used as an illumination apparatus that illuminates a room or the like while displaying the main image to the observer.

At least two features of the features according to the present technology, which have been described above, may be combined. That is, the various features described in the respective embodiments may be arbitrarily combined across the respective embodiments. Moreover, the above-mentioned various effects are merely illustrative, not limitative, and other effects may be provided.

In the present disclosure, the "same", "equal", "orthogonal", and the like are concepts including "substantially the same", "substantially equal", "substantially orthogonal", and the like. For example, conditions included in a predetermined range (e.g., ±10% range) based on "completely the same", "completely equal", "completely orthogonal", and the like are also included.

It should be noted that the present technology can also take the following configurations.

(1) A display apparatus, including:
    a display unit including a tubular display whose directional range in which an image is displayed is larger than 180 degrees;
    a motion sensor that detects an observer who observes the display;
    a region setting unit that sets a first region visible from the observer and a second region different from the first region as regions on the display on the basis of a detection result of the motion sensor; and
    an information generating unit that generates main information displayed in the first region and illumination information regarding illumination light presented in accordance with the second region.

(2) The display apparatus according to (1), in which
    the region setting unit sets the first region on the basis of a directional range of the display that is visible from one eye of the observer and a congestion angle when seeing the display with both eyes of the observer.

(3) The display apparatus according to (1) or (2), in which
    the display configures a cylindrical surface on which an image is displayed, and
    provided that D denotes a diameter of the cylindrical surface, Lv denotes an observation distance from an axis of the cylindrical surface to an observation position, Le denotes a distance between left and right eyes of the observer, and e denotes a display angle in a directional range that defines the first region, the region setting unit calculates the display angle θ in accordance with Expression (1) below

[Formula 2]

$$\frac{\theta}{2} = \cos^{-1}\left(\frac{D/2}{\sqrt{L_v^2 + \left(\frac{L_e}{2}\right)^2}}\right) + \tan^{-1}\left(\frac{L_e/2}{L_v}\right). \quad \text{Expression (1)}$$

(4) The display apparatus according to any one of (1) to (3), in which
the motion sensor is capable of detecting a distance to the observer, and
the region setting unit sets the first region in accordance with the distance to the observer.

(5) The display apparatus according to any one of (1) to (4), in which
the motion sensor is capable of detecting a plurality of observers simultaneously, and
the region setting unit calculates a plurality of individual regions as regions on the display visible from the plurality of observers and sets a region that is a sum set of the plurality of individual regions as the first region.

(6) The display apparatus according to any one of (1) to (5), in which
the main information includes information about a main image displayed in the first region, and
the illumination information includes information about an enhancement image that generates the illumination light by being displayed in the second region for adding an effect to display of the main image.

(7) The display apparatus according to (6), in which
the information generating unit generates the enhancement image in accordance with the main image or reads the enhancement image associated with the main image.

(8) The display apparatus according to (6) or (7), in which
the information generating unit generates the enhancement image on the basis of at least one of chromatic information, brightness information, or motion information regarding the main image.

(9) The display apparatus according to any one of (6) to (8), in which
the information generating unit sets a luminance of a portion of the enhancement image, which overlaps a display object included in the main image, to be lower than a luminance of another portion of the enhancement image.

(10) The display apparatus according to any one of (6) to (9), in which
the information generating unit controls a switching line for switching each of the main image and the enhancement image to a next image by moving along the display.

(11) The display apparatus according to (10), in which
the information generating unit sets an initial position of the switching line to be a position invisible from the observer and moves the switching line along a circumferential direction of the display, thereby consecutively switching the main image and the enhancement image.

(12) The display apparatus according to (10), in which
the switching line includes a first line for switching the main image and a second line for switching the enhancement image, and
the information generating unit sets initial positions of the first line and the second line to be positions in a boundary between the main image and the enhancement image and moves the first line and the second line simultaneously in a same movement direction as viewed from the observer, thereby switching the main image and the enhancement image in synchronization.

(13) The display apparatus according to any one of (1) to (12), further including
an illumination unit including a plurality of illumination devices that emits the illumination light to a periphery of the display apparatus, in which
the illumination information includes information about an illumination pattern of the illumination light.

(14) The display apparatus according to (13), in which
the plurality of illumination devices is provided outside the display.

(15) The display apparatus according to (13), in which
the display is a transparent screen that diffuses light entering from a predetermined direction, and
the plurality of illumination devices is provided inside the display so that the illumination light enters the display in a direction different from the predetermined direction.

(16) The display apparatus according to any one of (1) to (15), in which
the display is a 360-degree display capable of displaying an image in an entire periphery.

(17) The display apparatus according to any one of (1) to (16), in which
the display is either one of a transparent display that transmits visible light and an opaque display that does not transmit visible light.

(18) The display apparatus according to any one of (1) to (17), in which
the motion sensor includes at least one of a camera sensor, an infrared sensor, a pyroelectric sensor, an ultrasonic sensor, a time of flight (ToF) sensor, or a directional microphone.

(19) A display method, including:
detecting an observer who observes a tubular display whose directional range in which an image is displayed is larger than 180 degrees;
setting a first region visible from the observer and a second region different from the first region as regions on the display on the basis of a detection result of the motion sensor; and
generating main information displayed in the first region and illumination information regarding illumination light presented in accordance with the second region.

REFERENCE SIGNS LIST

1 image light
2, 2a, 2b observer
3 observation direction
5, 5a to 5f main display region
6 sub-display region 7, 7a, 7b main image
8, 8a, 8b enhancement image
9, 9a, 9b individual region
11, 211, 311, 411, 511 display unit
12, 212, 312, 412, 512 motion sensor
15, 515, 615 screen
17 outer circumferential surface
19, 219, 319, 419, 519 storage unit
20 main image data
21 output image data
26 display object
27 black background region
28, 28a, 28b switching line
30, 230, 330, 430, 530 controller
31, 231, 331, 431, 431 human detection processing unit
32, 232, 332, 432, 532 display region setting unit
33, 333, 433a, 433b, 533 feature extracting unit
34, 334, 434a, 434b, 534 enhancement image generating unit
35, 235, 335, 435, 535 display image generating unit
100, 200, 300, 400, 500, 600 display apparatus
505, 605 illumination unit
506, 606 illumination device

The invention claimed is:

1. A display apparatus, comprising:
a display unit including a tubular display whose directional range in which an image is displayed is larger than 180 degrees;
a motion sensor that is configured to detect an observer who observes the tabular display; and
at least one processor configured to:
set a first region visible from the observer and a second region different from the first region as regions on the tabular display based on a detection result of the motion sensor; and
generate main information displayed in the first region and illumination information regarding illumination light presented in accordance with the second region.

2. The display apparatus according to claim 1, wherein the at least one processor is further configured to set the first region based on a directional range of the tabular display that is visible from one eye of the observer and based on a congestion angle when seeing the tabular display with both eyes of the observer.

3. The display apparatus according to claim 1, wherein the tabular display configures a cylindrical surface on which the image is displayed, and
provided that D denotes a diameter of the cylindrical surface, Lv denotes an observation distance from an axis of the cylindrical surface to an observation position, Le denotes a distance between left and right eyes of the observer, and θ denotes a display angle in a directional range that defines the first region, the at least one processor is further configured to calculate the display angle θ in accordance with Expression (1) below

[Formula 1]

$$\frac{\theta}{2} = \cos^{-1}\left(\frac{D}{2} / \sqrt{Lv^2 + \left(\frac{Le}{2}\right)^2}\right) + \tan^{-1}\left(\frac{Le}{2}/Lv\right).$$

Expression (1)

4. The display apparatus according to claim 1, wherein the motion sensor is configured to detect a distance to the observer, and
the at least one processor is further configured to set the first region in accordance with the distance to the observer.

5. The display apparatus according to claim 1, wherein the motion sensor is configured to detect a plurality of observers simultaneously, and
the at least one processor is further configured to calculate a plurality of individual regions as regions on the tabular display visible from the plurality of observers and set a region that is a sum set of the plurality of individual regions as the first region.

6. The display apparatus according to claim 1, wherein the main information includes information about a main image displayed in the first region, and
the illumination information includes information about an enhancement image that is configured to generate the illumination light by being displayed in the second region for addition of an effect to display of the main image.

7. The display apparatus according to claim 6, wherein the at least one processor is further configured to generate the enhancement image in accordance with the main image or read the enhancement image associated with the main image.

8. The display apparatus according to claim 6, wherein the at least one processor is further configured to generate the enhancement image based on a basis of at least one of chromatic information, brightness information, or motion information regarding the main image.

9. The display apparatus according to claim 6, wherein the at least one processor is further configured to set a luminance of a portion of the enhancement image, which overlaps a display object included in the main image, to be lower than a luminance of another portion of the enhancement image.

10. The display apparatus according to claim 6, wherein the at least one processor is further configured to control a switching line to switch each of the main image and the enhancement image to a next image based on a movement along the tabular display.

11. The display apparatus according to claim 10, wherein the at least one processor is further configured to set an initial position of the switching line to be a position invisible from the observer and move the switching line along a circumferential direction of the tabular display, thereby consecutively switch the main image and the enhancement image.

12. The display apparatus according to claim 10, wherein the switching line includes a first line to switch the main image and a second line to switch the enhancement image, and
the at least one processor is further configured to set initial positions of the first line and the second line to be positions in a boundary between the main image and the enhancement image and move the first line and the second line simultaneously in a same movement direction as viewed from the observer, thereby switch the main image and the enhancement image in synchronization.

13. The display apparatus according to claim 1, further comprising:
an illumination unit including a plurality of illumination devices configured to emit the illumination light to a periphery of the display apparatus, wherein
the illumination information includes information about an illumination pattern of the illumination light.

14. The display apparatus according to claim 13, wherein the plurality of illumination devices is provided outside the tabular display.

15. The display apparatus according to claim 13, wherein the tabular display is a transparent screen that is configured to diffuse light entering from a predetermined direction, and
the plurality of illumination devices is provided inside the tabular display so that the illumination light enters the display in a direction different from the predetermined direction.

16. The display apparatus according to claim 1, wherein the tabular display is a 360-degree display configured to display an image in an entire periphery.

17. The display apparatus according to claim 1, wherein the tabular display is either one of a transparent display that is configured to transmit visible light and an opaque display that does not transmit visible light.

18. The display apparatus according to claim 1, wherein the motion sensor includes at least one of a camera sensor, an infrared sensor, a pyroelectric sensor, an ultrasonic sensor, a time of flight (ToF) sensor, or a directional microphone.

19. A display method, comprising:
in a display apparatus:
detecting, via a motion sensor, an observer who observes a tubular display whose directional range in which an image is displayed is larger than 180 degrees;
setting a first region visible from the observer and a second region different from the first region as regions on the tabular display based on a detection result of the motion sensor; and
generating main information displayed in the first region and illumination information regarding illumination light presented in accordance with the second region.

* * * * *